(12) United States Patent
Smith

(10) Patent No.: US 11,705,713 B1
(45) Date of Patent: Jul. 18, 2023

(54) NETWORK PRIMARY FEEDER SELF PROTECTED TRANSIENT LIMITING DEVICE

(71) Applicant: David R. Smith, McKeesport, PA (US)

(72) Inventor: David R. Smith, McKeesport, PA (US)

( * ) Notice: Subject to any disclaimer, the term of this patent is extended or adjusted under 35 U.S.C. 154(b) by 0 days.

(21) Appl. No.: 17/877,450

(22) Filed: Jul. 29, 2022

(51) Int. Cl.
| | | |
|---|---|---|
| H02H 1/04 | (2006.01) | |
| H02H 3/34 | (2006.01) | |
| H02H 3/08 | (2006.01) | |
| H02H 1/00 | (2006.01) | |

(52) U.S. Cl.
CPC .......... *H02H 1/046* (2013.01); *H02H 1/0015* (2013.01); *H02H 3/085* (2013.01); *H02H 3/34* (2013.01)

(58) Field of Classification Search
CPC ...... H02H 1/046; H02H 1/0015; H02H 3/085; H02H 3/34
See application file for complete search history.

(56) References Cited

U.S. PATENT DOCUMENTS

| | | | | |
|---|---|---|---|---|
| 3,343,080 | A * | 9/1967 | Fox .................. | G01R 31/08 324/541 |
| 4,151,460 | A * | 4/1979 | Seese ................ | H02H 3/14 324/529 |
| 2013/0335097 | A1 * | 12/2013 | Johansson ........... | G01R 31/343 324/510 |
| 2017/0358919 | A1 * | 12/2017 | Smith ................. | H02H 1/0007 |
| 2020/0274349 | A1 * | 8/2020 | Javora ................ | H02H 1/0007 |

FOREIGN PATENT DOCUMENTS

| | | | |
|---|---|---|---|
| JP | 08065881 A | * | 3/1996 |
| JP | 08094683 A | * | 4/1996 |

\* cited by examiner

*Primary Examiner* — Scott Bauer
(74) *Attorney, Agent, or Firm* — Eckert Seamans Cherin & Mellott, LLC

(57) ABSTRACT

A device is presented for use in power distribution networks, for limiting transient overvoltages during backfeed on a network primary feeder whose feeder breaker is open and whose network protector fails to open. The device is self-contained and self-protecting, and limits the transient voltages due to an arcing single line-to-ground fault by inserting a resistance into the zero-sequence network of the primary feeder. Limiting transient overvoltages reduces damage to and prevents failures of various network components, and in particular, prevents multiple insulation failures during backfeed and reduces failures during backfeed in microprocessor network protector relays on the secondary side of network transformers whose protectors are open. In addition, the device reduces transient overvoltages associated with re-energizing a network primary feeder by closing the station breaker when all network protectors on the feeder are open, as occurs when restoring a network primary feeder that has been out of service.

20 Claims, 13 Drawing Sheets

Closing Control Logic for Three-Phase Grounding Swtich

NETWORK PRIMARY FEEDER SELF PROTECTED TRANSIENT LIMITING DEVICE

FIELD OF THE INVENTION

The disclosed concept relates generally to devices and systems for reducing damage to and preventing failures of various components of low-voltage (LV) network power distribution systems during backfeed, and in particular, to devices and systems for preventing multiple insulation failures during backfeed in various components associated with network primary feeder cables, as well as for reducing failures during backfeed in microprocessor network protector relays on the secondary side of network transformers whose network protectors are open.

BACKGROUND OF THE INVENTION

Low-voltage (LV) secondary network systems are used for reliable power distribution in the downtown commercial areas of most major cities in the United States. Cities having secondary networks include New York, Boston, Atlanta, Chicago, Washington D.C., San Francisco, Seattle, Portland Oreg., Memphis, DesMoines, Tulsa, Albany, Tampa, Minneapolis, Denver, Houston, Pittsburgh, Fort Worth, and many others. The LV network is selected for commercial area distribution because it provides the highest reliability possible with conventional types of power distribution systems. The largest user of secondary network systems is the Consolidated Edison Company of New York, where approximately 85% of their total system load is supplied from LV secondary network systems.

FIG. 1 is a schematic single-line diagram showing a simplified three-feeder secondary (LV) network distribution system 1. Distribution network 1 includes both a 208Y/120 V grid (area) network 2, and a single two-unit spot network 4 (shown on the right side of FIG. 1, with the load side of the spot network 4 being labeled with reference number 5). The grid network 2 operates at a voltage of 208Y/120 V and is supplied by multiple network units 6 comprising network transformers 7 and their network protectors 8. As is customary in the relevant field, in FIG. 1 (as well as in FIGS. 2-3, detailed later herein) each network unit 6 is coupled with a numerical identifier in the format #1-#2, wherein the first digit #1 identifies the feeder on which the network unit 6 is located, and the second digit #2 identifies the sequential position of the particular network unit 6 on the feeder identified. It should be noted that the numerical identifiers used for the network units 6 shown in FIGS. 1-3 are circled. In FIG. 1, one network unit 6 is labeled a "Network Unit" and comprises a network transformer 7 and a network protector 8. For clarity of presentation in FIG. 1, only two other such network units 6, network transformers 7, and network protectors 8 are labeled with these reference numbers, but it is understood that all similar schematically depicted transformer-network protector arrangements shown in FIG. 1 also constitute network units 6 comprising network transformers 7 and network protectors 8. The secondary side of the network transformers 7 are interconnected through LV cable circuits 10, also referred to as secondary mains 10. In the grid network 2, all power and lighting load is supplied from the LV secondary mains 10. Spot networks such as the two-unit spot network 4 frequently operate at a voltage of 480Y/277 V to supply a large load, such as a high-rise building. In FIG. 1, only one load 11 supplied by the secondary mains 10 is labeled in the upper right-hand quadrant of the figure (the load in FIG. 1 being a 3-phase 4-wire load denoted "3-P 4-W"), but it is noted that other loads 11 would be similarly connected to the secondary mains 10 in order to be supplied by the grid network 2.

The LV secondary distribution network 1 consists of three major parts, as shown in FIG. 1. The first part is the network substation or area substation 12 comprising a bus 13 and from which primary feeders 14 to the secondary network 1 originate. In FIG. 1, primary feeders 14 include the feeders labeled FEEDER 1, FEEDER 2, and FEEDER 3. The nominal voltage level for primary feeders (such as primary feeders 14) that supply secondary networks (such as secondary network 1) ranges from 4.8 kV up to 34.5 kV. The most common voltages for such primary feeders 14 are typically in the 15 kV class, which includes voltages of 11 kV, 12.47 kV, 13.2 kV, 13.8 kV, and 14.4 kV. For example, the primary feeders that supply the LV secondary network in Manhattan and the Bronx use 13 kV. While the system depicted in FIG. 1 only includes three primary feeders 14, the number of primary feeders included should be dictated by the size and needs of the particular secondary network system, and it should be noted that secondary networks are known to have 16 or more primary feeders.

Still referring to FIG. 1, three-phase transformers such as the network transformers 7 step down the primary voltage in order to reduce the voltage to a lower value from which the load can be directly served. For a grid network such as the grid network 2, the stepped-down voltage produced by the network transformers 7 is 208Y/120 V three-phase four-wire. In most systems, the high-voltage (HV) windings of the network transformer are connected in delta, and the LV windings are connected in wye, as depicted for the network transformer 7 at location 3-2 in FIG. 1. Each network protector 8 installed between the LV (secondary) terminal of the associated network transformer 7 and the LV grid network 2 automatically disconnects the associated network transformer 7 from the secondary network 1 when power starts flowing in a predetermined reverse direction. All load in the area network 2 is supplied from the LV cable circuits 10 and from the network protector 8 terminals.

Continuing to refer to FIG. 1, it is seen that there are multiple parallel paths 15 supplying power from the network substation 12 to each load 11 supplied from the grid network 2. I.e. all loads 11 supplied from the grid network 2 are connected to the secondary mains 10, and each of the secondary mains are connected to the secondary side of multiple network units 6, thus, there are multiple paths 15 leading to each grid-fed load 11 from multiple primary feeders 14. For the spot network 4 on the right-hand side of FIG. 1, there are two parallel paths 16 from the network substation 12 (area substation) to the load 5, i.e. one path 16 leading from FEEDER 2 to the spot network 4 and one path 16 leading from FEEDER 3 to the spot network 4. Employing parallel paths 15 or 16 between the network substation 12 and any given load 11 or 5 served from the secondary network 1 enables any one parallel path 15 or 16 to be removed from service while ensuring that the load 11 or 5 served from the grid (area) network 2 or the spot network 4 will not experience a power interruption. The removal of a parallel path from service may be required, for example and without limitation, in the event that work needs to be performed on components of the path or in the event of a fault (short circuit). The ability to service one parallel path without interrupting the supply of power to the load renders the LV secondary network is the setup that provides the highest level of reliability possible with conventional types of power distribution systems.

FIG. 2 depicts a single line to ground (SLG) fault (short circuit) 20 having occurred on a network primary feeder 14, specifically FEEDER 2. When a fault occurs on a feeder 14, high currents flow from the substation 12 to the fault, the protective relays (not shown or numbered separately in the figures) for the feeder breaker 18 at the substation 12 detect the high currents, and the feeder breaker 18 for the feeder 14 on which the fault is detected opens, as shown for FEEDER 2 in FIG. 2. Referring now to FIG. 3, after the fault is detected on FEEDER 2 and the associated the feeder breaker 18 opens as shown in FIG. 2, the network relays open in each network protector 8 supplied from FEEDER 2, as shown in FIG. 3 at locations 2-1, 2-2, and 2-3 (for the area network) and at location 2-4 (for the spot network). Under these conditions the fault or short circuit on FEEDER 2 is isolated from the network substation 12 and from the LV grid and spot networks 2, 4. As previously stated with respect to FIG. 1, because each grid-supplied load 11 is supplied by multiple feeders 14 via multiple parallel paths 15 and because each spot network load 5 is supplied by multiple feeders 14 via multiple paths 16, isolating the fault or any type of disturbance on any one primary feeder 14 does not cause a loss of service to any customer supplied from the secondary network 1, whether the customer is being serviced by the grid network 2 or by the spot network 4.

Primary Feeder Grounding

The network substation 12 and the primary feeders 14 of the network 1 shown in FIGS. 1-3 are part of a grounded power system, as determined by the system grounding used in the network (area) substation 12. Depending on the utility, with the primary feeder breaker 18 closed, the primary feeder 14 may be effectively grounded, low inductance grounded, high inductance grounded, or resistance grounded. Referring now to FIG. 4, a five feeder LV network 50 is shown. The LV network 50 comprises a network substation 52, five primary feeders 54 (only one of which, FDR 3, is shown in detail), and a feeder breaker 55 for each primary feeder 54. In FIG. 4, there is a fault (short circuit) 70 on FDR 3. With the feeder breaker 55 for FDR 3 closed as shown in FIG. 4, the current $I_{SUB}$ flowing from the substation 52 to the fault is very high, and the current $I_{BACK}$ flowing back to the fault from the network is relatively low, as the fault on the feeder 54 lowers the voltage on the substation bus 62 that supplies the five network feeders 54. With the feeder breaker 55 for FDR 3 closed, the network primary feeder 54 is part of a grounded system, and the voltages occurring from phase-to-ground on the feeder 54 with the fault 70 are limited to acceptable values with the feeder breaker 55 closed. It is noted that the delta connections of the HV windings 57 (primary windings of the network transformers 56 on the feeder 54) shown in FIG. 4 are the most common arrangement in use today.

Still referring to FIG. 4, with the high current flowing in FDR 3 from the substation 52 to the fault 70, the overcurrent relays for the feeder breaker 55 for FDR 3 detect the fault and the feeder breaker 55 for the faulted feeder will open, as shown in FIG. 5. In general, the network relays in the network protector 58 on the faulted feeder 54 will not detect the fault on the primary feeder 54 until after the primary feeder breaker 55 at the network substation 52 opens. After the feeder breaker 55 at the substation 52 opens, and before any network protectors 58 open, the primary feeder 54 with the open breaker 55 at the substation 52 is energized from the delta connected HV windings 57 of the network transformers. Thus, the primary feeder 54 transitions from a grounded primary system with the feeder breaker 55 closed to an ungrounded system with the feeder breaker 55 open and one or more closed backfeeding network protectors 58.

Primary Feeder Voltages During Backfeed to a Single Line-to-Ground (SLG) Fault

Still referring to FIG. 5, if the fault 70 on primary feeder 54 (FDR 3) is a bolted (solid) single line-to-ground (SLG) fault on one phase, then the voltage to ground on the two unfaulted phases on the primary feeder 54 rises up to the primary system phase-to-phase voltage until all backfeeding network protectors 58 open. This means that the insulation for the primary cables, cable splices, and HV parts of the network transformers 56 must be able to withstand voltage levels ranging from phase-to-ground voltage to full phase-to-phase voltage until all backfeeding network protectors 58 open. Operating experience shows that most faults that occur on network primary feeders 54 start from phase-to-ground on one phase, based on observation of relay targets and current and voltage waveforms obtained at the network substation buses 62 that supply the network primary feeders 54, and from inspection of the failed component. The reason for this is that the primary cables and splices are shielded, and an insulation failure occurs from one phase to the cable shield or flat-strap concentric neutral (ground). Although the initial fault on the feeder 54 is single line-to-ground at one location, there are many cases in which the utility determines, after the feeder 54 is removed from service and tested, that there are insulation failures to ground at another location on the faulted primary feeder 54.

Arcing Single Line-to-Ground (SLG) Fault on Backfed Primary Feeder

Continuing to refer to FIG. 5, when an SLG fault 70 occurs on the primary feeder 54 and the primary feeder breaker 55 at the substation is open, with one or more network protectors 58 closed and energizing the primary feeder 54 from the delta connected HV winding 57 of the network transformers 56, then the SLG fault 70 is on an ungrounded system rather than a grounded system. If the SLG fault 70 is arcing in nature, extremely high transient voltages can be generated on the network primary feeder 54 at the location where the arc at the fault point strikes and then extinguishes, repetitively. It is believed that these high transient voltages, whose peak can approach 4 or 5 times the peak of the normal phase-to-ground voltage of the primary feeder 54, are responsible for the insulation failures that occur at locations other than where the SLG arcing fault initiated.

In many network protectors on systems today, the network relays are microprocessor type relays located within the network protector enclosure on the secondary side of the network transformers. When a network protector is open and other network protectors on the primary feeder are closed and still backfeeding the arcing SLG fault, the high transient voltages on the primary feeder are transmitted to the secondary side of those network transformers whose network protectors are open. In the network protector, the microprocessor network relay is connected to sense and measure the voltages from phase-to-ground on the transformer side of the open network protector.

In network protectors on the secondary side of network transformers with a rated secondary voltage of 208Y/120 volts used for the grid network, the network relay is connected directly to the power buses within the network protector. But in network protectors on the secondary side of network transformers with a rated secondary voltage of 480Y/277 volts, the network relays are supplied from relay autotransformers which lower the phase-to-ground voltage of 277 volts to 120 volts for the network relay. That is, the same network relay is used in network protectors in 480-volt and 208-volt systems, except that relay autotransformers are included in the protectors in the 480-volt system.

Utilities have observed that following the clearing of a fault on the network primary feeder, there have been failures in microprocessor network protector relays whose protectors have opened. It appears that most of the microprocessor network protector relays observed to have failed have been in 208Y/120-volt network protectors where the relay is connected directly to the power buses on the transformer side of the open network protector. It is believed that these failures have occurred from the high transient voltage generated during backfeed to arcing SLG faults on the primary feeder with feeder breaker 55 open, where high transient voltages appear at the secondary side of the network transformers whose protectors are open.

In contrast, there are not as many failures in microprocessor relays on 480-volt network protectors on the faulted primary feeder, due to there being a relay auto transformer between the power buses of the network protector and the microprocessor network relay in the 480-volt network protectors. These auto transformers reduce the magnitude of the transient voltages impressed on the network relay connected to the secondary side of the auto transformer. It should be noted that the microprocessor relay used in 480-volt protectors is the same microprocessor relay used in 208-volt network protectors, with the only difference in the 208-volt and 480-volt network protectors being the inclusion of the relay autotransformer in the 480-volt protector. The auto transformer reduces the amount of energy that the solid-state surge suppression devices in the microprocessor relays must absorb, allowing them to survive. However, in the 208-volt network protectors, the surge suppression devices must absorb much higher energies in limiting the voltages impressed on the electronic components of the microprocessor relays. To solve this problem in 208-volt network protectors, at least one manufacturer of network protectors has started to connect the microprocessor relays to the power buses through two-winding 1:1 ratio transformers, to reduce the energy input to the surge suppression devices in the network relay.

Limiting Transient Voltages from Arcing Single Line-to-Ground (SLG) Faults

The earliest electric power systems were operated as ungrounded systems. In these systems, if a solid single line-to-ground (SLG) fault occurred, the system could remain energized. Ungrounded medium-voltage (MV) systems have been used in many industrial power systems that include critical processes where a power outage must be prevented. In these systems, the loads such as motors and other equipment are supplied from the secondary side of three-phase unit substation transformers with the HV windings connected in delta to the ungrounded MV system. With a solid SLG fault on the MV system, the voltages supplied to the load on the secondary side of the three-phase unit substation transformers with delta connected HV windings are perfectly normal. There is no interruption to the processes in the plant or factory, and production continues uninterrupted.

However, when the fault in the MV ungrounded system was an arcing SLG fault, it was usually found that there were insulation failures in other equipment, such as dry-type unit substation transformers and motors supplied from the unit substation transformers. It is widely recognized that these failures are due to arcing SLG faults in the MV portion of the ungrounded industrial power system. To prevent the high transient voltages from arcing ground faults in ungrounded systems in industrial applications, high resistance grounding was adopted for these systems. With high resistance grounding, the high transient overvoltages from arcing SLG faults are limited, yet the system can remain energized with a bolted SLG fault. The criteria for selecting the resistance for the high-resistance grounding are well established.

Limiting Transient Voltages from Arcing Single Line-to-Ground (SLG) Faults on Backfed Network Primary Feeder Referring once more to FIG. 5, when the feeder breaker 55 at the network substation 52 is open but the feeder 54 is energized from the delta-connected HV windings 57 of network transformers 56 whose network protectors 58 are closed, the feeder 54 is part of an ungrounded system. If the fault 70 is an arcing SLG, then very high transient voltages are developed, which can cause other insulation failures and failures to the microprocessor network relays in network protectors 58 that are open on the secondary.

There is thus room for improvement within devices and systems for preventing multiple insulation failures and failures in microprocessor network protector relays during backfeed to arcing single line-to-ground (SLG) faults in a low-voltage network power distribution system.

SUMMARY OF THE INVENTION

These needs, and others, are met by embodiments of the disclosed concept in which a network primary feeder self-protected transient limiting device limits the high transient overvoltages due to arcing single line-to-ground (SLG) faults on a primary feeder that occur during backfeed with the primary feeder breaker open. Limiting these high transient overvoltages prevents multiple insulation failures in primary cables, primary cable splices, network transformers, and other equipment on the network primary feeder, thus allowing the utility to repair the original fault, and return the primary feeder to service in a shorter time. Returning the primary feeder to service in a shorter time is a significant advantage, as it has been shown that the longer a network primary feeder is out of service, the more likely a fault will occur on another network primary feeder, thus creating a condition where two primary feeders are removed from service. In addition, limiting these high transient overvoltages also prevents or reduces the failures in microprocessor network protector relays on the secondary side of network transformers whose network protectors are open. This is another significant advantage, as the failure of a network protector relay can lead to significant time and expense being expended to locate and replace the failed relay.

[This summary section will be completed after the claims are finalized, as the summary section will be based on the claims.]

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
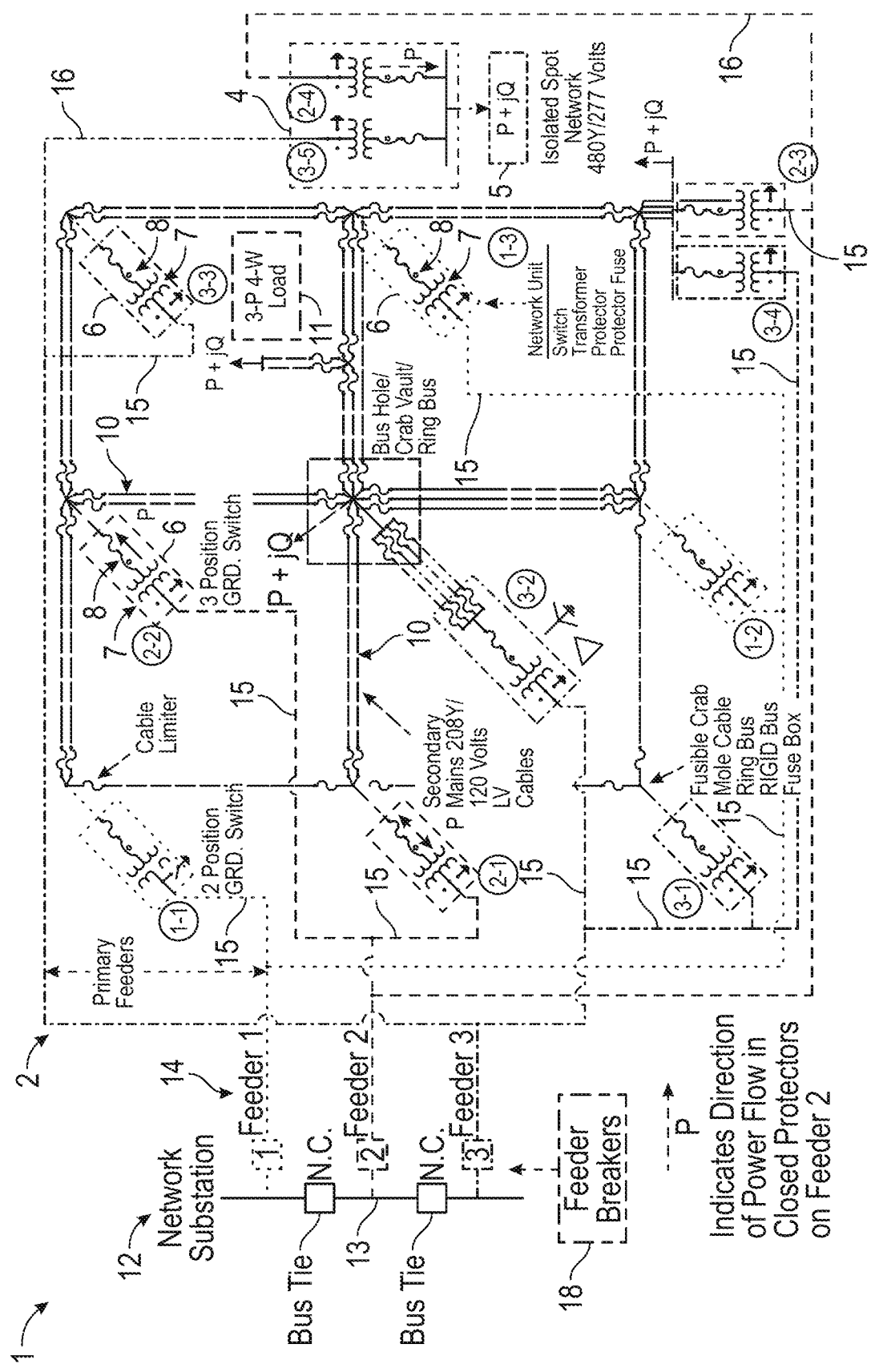
FIG. 1 is a schematic single-line diagram showing a simplified three-feeder secondary distribution network, including both a grid network and a spot network, wherein each load supplied by the grid network or by the spot network is supplied by at least two primary feeders.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

List of Abbreviations

For the sake of brevity, several abbreviations that pertain to various characteristics and conditions of power distribution systems are used herein, as listed below:

LV: low voltage
HV: high voltage
MV: medium voltage
SLG fault: single line-to-ground fault
DLG fault: double line-to-ground fault Network Primary Feeder Self Protected Transient Limiting Device Referring now to FIG. 6, a Network Primary Feeder Self-Protecting Transient Limiting Device 100 (referred to hereinafter as the "NPF SPTL device 100") is shown, in accordance with an exemplary embodiment of the disclosed concept. The NPF SPTL device 100 is intended for application on a network primary feeder, and is designed to limit high transient overvoltages due to arcing single line-to-ground (SLG) faults on the primary feeder that occur during backfeed with the primary feeder breaker open. Specifically, the NPF SPTL device 100 is designed to be an add-on component that is connected to each primary feeder of a LV network system, with there being one NPF SPTL device 100 connected to each primary feeder of the LV network system. For example and without limitation, if it were desired to implement the NPF SPTL device 100 in a distribution network such as the three-feeder secondary power distribution network 1 shown in FIGS. 1-3, then each given network primary feeder 14 would have a dedicated NPF SPTL device 100 connected to the primary feeder at any convenient location on the primary feeder, in order to limit high transient overvoltages during backfeed to arcing SLG faults on the primary feeder 14 corresponding to the one or more network transformers 7 having a closed network protector 8. In another non-limiting example, if it were desired to implement the NPF SPTL device 100 in a distribution network such as the five feeder LV network 50 shown in FIGS. 4-5, then each given network primary feeder 54 would have a dedicated NPF SPTL device 100 connected to the primary feeder at a convenient location in order to limit high transient overvoltages during backfeed to arcing SLG faults on the primary feeder 54 corresponding to the one or more network transformers 56 having a closed network protector 58.

Figure 2:
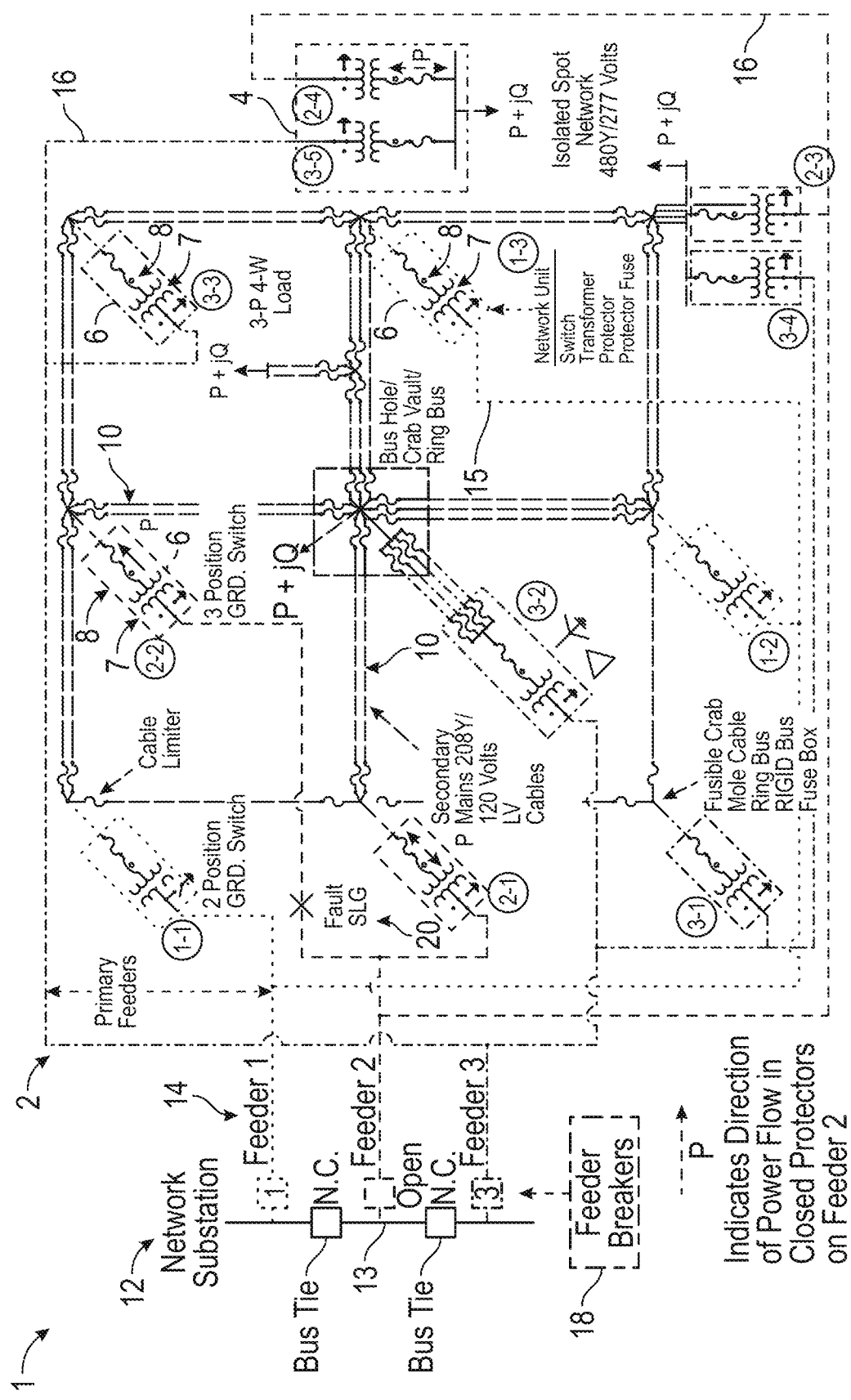
FIG. 2 shows the schematic line diagram shown in FIG. 1 after fault has occurred on a primary feeder.
Figure 3:
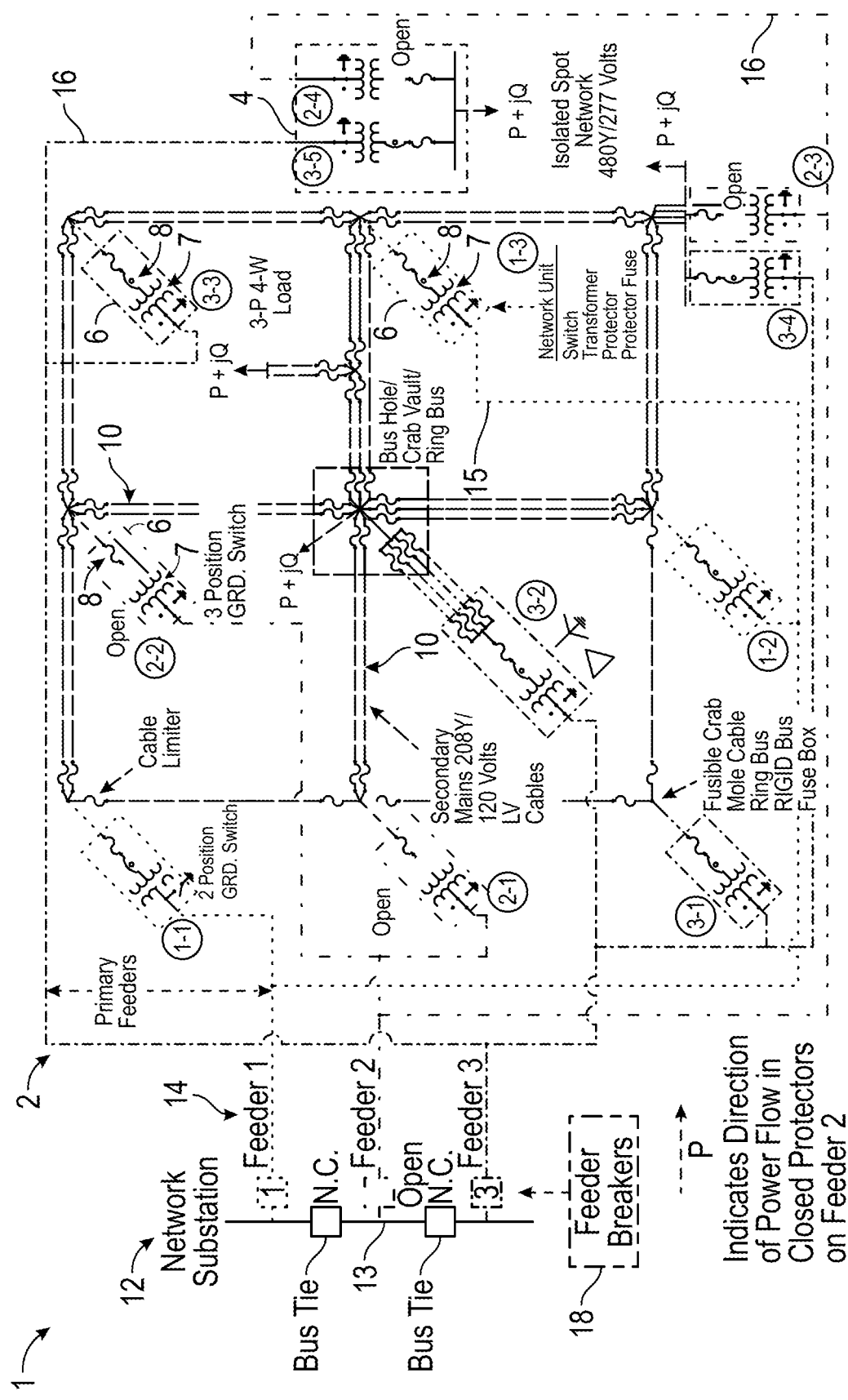
FIG. 3 shows the schematic line diagram shown in FIG. 2 and how the network relays open for each network protector supplied from the primary feeder where the fault occurred, in order to isolate the fault from the network substation, the low-voltage (LV) grid network, and spot network.

For the sake of brevity, the NPF SPTL device 100 is primarily described hereinafter as being implemented for use with each of the primary feeders 14 of the three-feeder secondary power distribution network 1 shown in FIGS. 1-3, but it should be understood that the power distribution network 1 is being used solely for illustrative purposes and is a non-limiting example of a network in which the NPF SPTL device 100 can be implemented. As seen in the above description of the implementation of the NPF SPTL device 100 in the three-feeder secondary power distribution network 1 shown in FIGS. 1-3 and in the five-feeder LV network 50 shown in FIGS. 4-5, a NPF SPTL device 100 can be used in a LV network system regardless of the number of primary feeders in the LV network system. A NPF SPTL device 100 simply needs to be placed on each network primary feeder in a LV network system.

The primary benefits resulting from the application of the NPF SPTL device 100 are: (1) prevention of multiple insulation failures in primary cables, primary cable splices, network transformers, and other equipment on a network primary feeder when arcing SLG faults occur during backfeed, and (2) prevention or reduction of the failures in microprocessor network protector relays on the secondary side of network transformers whose network protectors are open when arcing SLG faults occur during backfeed. With respect to benefit (1), prevention of multiple insulation failures will allow the utility to repair the original fault, and return the primary feeder to service in a shorter time. If there are multiple insulation failures on the primary feeder, it takes much longer to locate all of the failures and repair multiple failures. The ability to return the primary feeder to service in a shorter time is notably important, as the largest user of LV secondary network systems, Consolidated Edison Co of NY, has determined that the longer a network primary feeder is out of service, the more likely a fault will occur on another network primary feeder, which creates a condition where two primary feeders are removed from service. With respect to benefit (2), prevention or reduction of the failures in microprocessor network protector relays eliminates or reduces the significant time and significant expense required to locate and replace the failed relay.

Figure 6:
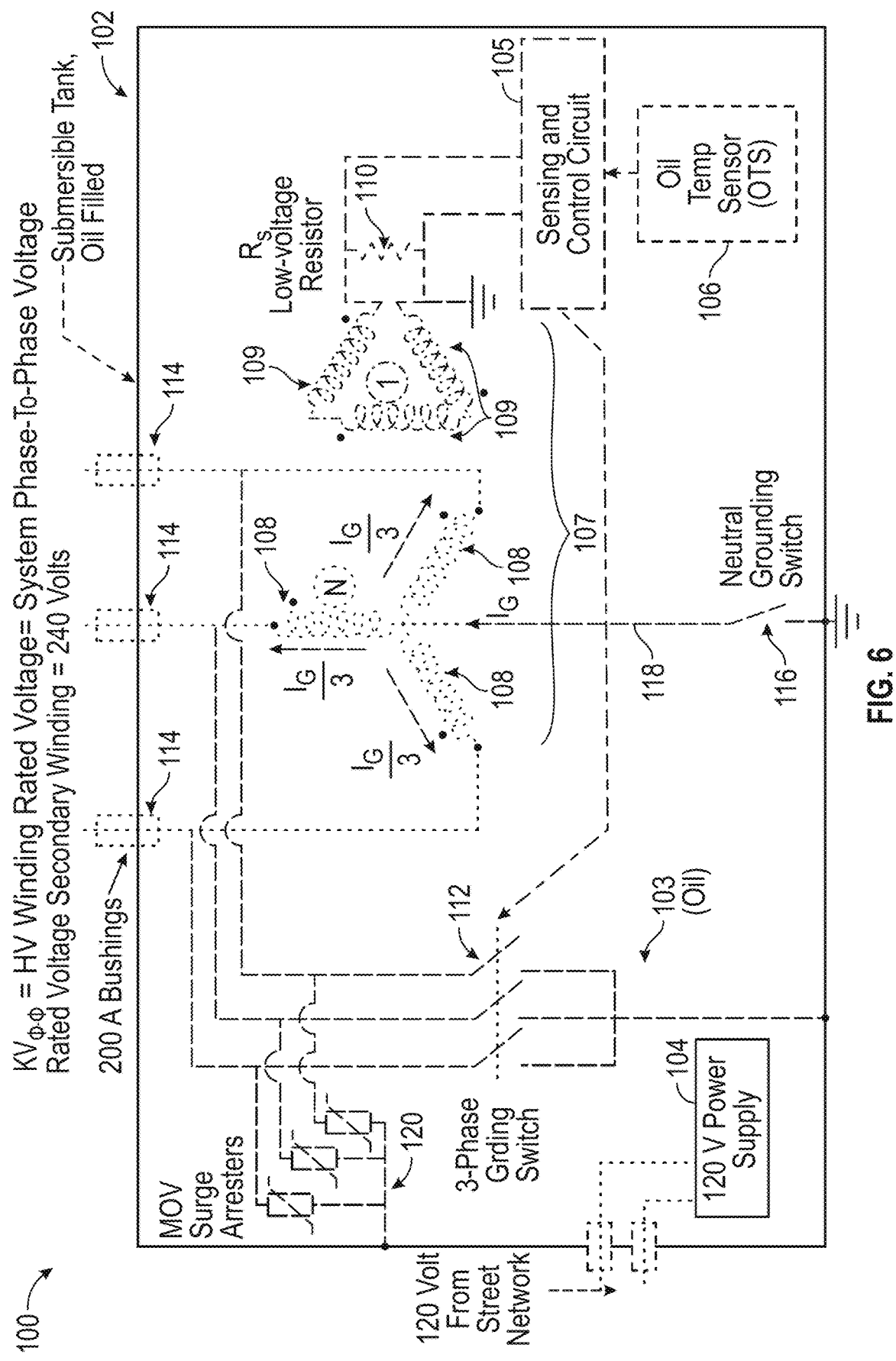
FIG. 6 shows a schematic depiction of a network primary feeder self-protecting transient limiting device designed to limit high transient overvoltages due to arcing single line to ground (SLG) faults on a primary feeder of a LV network distribution system, in accordance with an exemplary embodiment of the disclosed concept.

Still referring to FIG. 6, the major components of the NPF SPTL device 100 are mounted in a sealed tank 102 that is filled with an insulating fluid 103 having heat transfer properties, such as mineral oil. The sealed tank 102 is designed to be similar to that of a network transformer, and is structured to be installed in a vault similar to that used for a network transformer. Although FIG. 6 shows a 120-volt power supply 104 and a sensing and control mechanism 105 (comprising a number of sensing and control circuits) located within the tank 102 along with the oil 103 (the sensing and control mechanism 105 being powered by the power supply 104), the power supply 104 and sensing and control mechanism 105 can also be located outside of the main tank 102 in separate compartments, without departing from the scope of the disclosed concept. Indeed, it is expected that, in practice, most customers would prefer the power supply 104 and sensing and control mechanism 105 to be located outside of the main tank 102, so that the sensing and control mechanism 105 is not subjected to the high temperatures of the oil 103 during backfeed to bolted SLG or DLG faults. As indicated in FIG. 6, the power supply 104 is designed to be connected to a 120-volt circuit, e.g. from a nearby manhole with secondary circuits of the 208Y/120-volt grid (area) network 2. An oil temperature sensor 106 is located within the tank 102 in order to sense the temperature of the oil 103. Regardless of whether the sensing and control mechanism 105 is located within or outside of the main tank 102, the oil temperature sensor 106 is configured to be in communication with the sensing and control mechanism 105.

The NPF SPTL device 100 in FIG. 6 consists of three standard distribution transformer single-phase core-coil assemblies 107, with the HV windings 108 connected in grounded wye, and the LV or secondary windings 109 connected in broken delta. Within the broken delta secondary windings 109 is a low-voltage resistor 110, which may be referred to hereinafter as the resistor on the secondary, $R_S$ 110. The ohmic value of $R_S$ 110 is given by Equation (4), detailed later herein. As shown in FIG. 6, the resistor $R_S$ 110 is connected across the broken point of the broken delta secondary windings 109. The single-phase core-coils 107 and resistor $R_S$ 110 insert into the zero-sequence network of the primary feeder 14 a resistance that limits the transient voltages due to the arcing SLG fault when the feeder breaker 18 is open. It should be noted that the mineral oil 103 serves to limit the temperature rise of the resistor $R_S$ 110 during backfeed to a bolted SLG fault on a primary feeder 14 with a network protector 8 that fails to open.

Connected to the terminals of the resistor $R_S$ 110 is circuitry in the sensing and control mechanism 105 that monitors the voltage across the resistor $R_S$ 110. As discussed and quantified later herein, if a bolted SLG fault occurs on the backfed primary feeder 14, and a backfeeding network protector 8 fails to open, extremely large powers are dissipated in the resistor $R_S$ 110. To protect the resistor $R_S$ 110 and limit the temperature rise of the oil 103, a three-phase grounding switch 112 is included in the main tank 102. The control circuits in the sensing and control mechanism 105 are configured to close the grounding switch 112 only when both of two conditions are true: (1) the primary feeder breaker at the substation 18 is open, and (2) there are one or more backfeeding network protectors 8 that have failed to open. Closing of the three-phase grounding switch 112 with the primary feeder breaker 18 open will blow open any fuse(s) in the backfeeding network protector(s) 8 that fail(s)

to open. This removes voltage from resistor $R_S$ 110, and it is this feature that makes the NPF SPTL device 100 self-protecting.

The HV windings 108 of the single-phase core-coil assemblies 107 are connected to HV bushings 114 on the top of the sealed tank 102, and the bushings 114 are connected to the primary feeder 14 using, for example and without limitation, either 200 Ampere or 600 Ampere elbow type connectors and single conductor cables. Also included in the NPF SPTL device 100 is a Neutral Grounding Switch 116 disposed between the neutral 118 of the wye-connected HV windings 108 and the tank 102, where the tank 102 is connected to the sheaths or concentric neutrals of the primary cables and grounded, just as is done for the tank of a three-phase network transformer. The neutral grounding switch 116 operating handle is disposed on the exterior of the tank 102. The neutral grounding switch 116 must be opened when doing fault locating and testing of the primary feeder circuit after the network primary feeder 14 is repaired following a fault (e.g. short circuit).

Also included in the tank 102 under the oil 103 are metal oxide varistor surge arresters 120, to further help limit any transient overvoltages that occur during backfeed to the arcing SLG fault. In FIG. 6 these are labeled "MOV SURGE ARRESTERS". These metal oxide surge arresters 120 must have a maximum continuous operating voltage (MCOV) that is at least 110% of the primary system phase-to-phase voltage. The reason for this is that during backfeed to a bolted SLG fault, system full phase-to-phase voltage is applied to the metal oxide surge arresters 120. Although FIG. 6 shows these surge arresters 120 located inside the tank under oil, as with the 120-volt power supply and sensing and control circuits shown located inside of tank 102, the surge arresters 120 can also alternately be located outside of the tank 102 and attached to the elbow connectors which connect the NPF SPTL device 100 to the primary feeder 14 (i.e. the elbow connecters previously provided as an example of a connector type that can be used to connect the HV bushings 114 to the primary feeder 14), without departing from the scope of the disclosed concept. As shown in FIG. 6, the end of each surge arrester 120 that is not connected to the elbow connector is connected to the tank 102.

Determining the Parameters for the NPF SPTL Device

The procedures for determining the parameters for components that are used to limit transient voltages for arcing SLG faults on an ungrounded system are well-established, and are employed for the NPF SPTL device 100. In this section, the calculations to determine the kVA rating of each single-phase core-coil assembly 107 in FIG. 6 are given, along with the ohmic value for resistor $R_S$ 110 located in the broken delta secondary 109.

The starting point to determine the parameters of the NPF SPTL device 100 is to determine the total three-phase charging kVAr (reactive power) of the network primary feeder 14 that the NPF SPTL device 100 is to be placed on. Let:

$KVA_C$=primary cable three phase charging in kVAr per mile
$L_F$=primary feeder total length in miles
$KV_{\Phi\Phi}$=System $\Phi$ to $\Phi$ voltage in kV The total three-phase charging kVAr of the backfed primary feeder 14, $KVA_{CTOTAL}$, is that given by Equation (1):

$$KVA_{CTOTAL} = L_F * KVA_C \text{ kVAr} \tag{1}$$

The zero-sequence capacitive reactance of the backfed primary feeder 14 in Ohms, $X_{C0\Omega}$, is given by Equation (2), where all terms in the equation are defined for Eq. (1) above:

$$X_{C0\Omega} = \frac{KV_{\varphi\varphi}^2}{KVA_{CTOTAL}/1000} \text{ Ohms} \tag{2}$$

In order to limit the transient voltage during arcing SLG faults on an ungrounded system, the resistance inserted into the zero-sequence network of the primary feeder 14 in Ohms, $R_{0\Omega}$, should be equal to or less than the zero-sequence capacitive reactance, $X_{C0\Omega}$. This is expressed by the inequality of Equation (3):

$$R_{0\Omega} \leq X_{C0\Omega} \text{ Ohms} \tag{3}$$

In the following, the calculations are done assuming the $R_{0\Omega}$ is selected to equal $X_{C0\Omega}$. However, $R_{0\Omega}$ can be less than $X_{C0\Omega}$. In order to reflect to the HV side the resistance value $R_{0\Omega}$ given by Eq. (3), the ohmic value of the resistor $R_S$ 110 inserted into the broken delta 109 of the three single-phase core-coil assemblies is given by Equation (4):

$$R_{S\Omega} = \frac{3R_{0\Omega}}{N^2} \text{ Ohms} \tag{4}$$

In Eq. (4), the term N (the calculation of which is provided in Equation 5, below) is the ratio of the rated voltage of the HV winding 108 of each single-phase core-coil 107 to the rated voltage of the secondary winding 109, which is taken as 240 volts, but can be any value.

$$N = \frac{1000 KV_{\varphi\varphi}}{240} \tag{5}$$

Still referring to FIG. 6, when a bolted SLG fault occurs on the backfed primary feeder 14 with one or more network protectors 8 failing to open (the feeder breaker 18 at network substation 12 being open), the current in the connection between the neutral 118 of the wye-connected HV windings 108 of the three single-phase core-coil assemblies 107 is denoted by $I_G$ in FIG. 6. The value of this current $I_G$ in amperes is given by Equation (6):

$$I_G = 3 \frac{1000 KV_{\varphi\varphi}/\sqrt{3}}{R_{0\Omega}} \text{ Amps} \tag{6}$$

The current in the HV winding 108 of each single-phase core-coil assembly 107 is exactly one third of that given by Eq. (6). A conservative approach is to select the kVA rating of each single-phase core-coil assembly 107 such that, when there is a bolted SLG fault on the backfed primary feeder 14 with one or more network protectors 8 closed, the kVA rating of each single-phase core-coil assembly 107 is not exceeded. Then the kVA rating of each single-phase core-coil assembly 107 should be that given by Equation (7):

$$KVA_T = 1000 \frac{KV_{\varphi\varphi}^2}{\sqrt{3} R_{0\Omega}} \text{ kVA} \tag{7}$$

Furthermore, the value of $R_{0\Omega}$ in Eq. (7) is in Ohms and is equal to the capacitive reactance $X_{C0\Omega}$ in Ohms as given by Eq. (2). Placing the value for $X_{C0\Omega}$ as given by Eq. (2) into Eq. (7), a simple expression results for the required kVA rating of each single-phase core-coil assembly 107, as shown by Equation (8):

$$KVA_T = \frac{KVA_{CTOTAL}}{\sqrt{3}} \text{ kVA} \qquad (8)$$

Eq. (8) simply states that the kVA rating of each single-phase core-coil assembly 107 in the NPF SPTL device 100 should be 58% of the total three-phase charging kVAr of the backfed network primary feeder 14. It should be noted that, although the preferred embodiment of the NPF SPTL device 100 uses three single-phase core-coil assemblies 107, as in FIG. 6, a three-phase transformer with primary windings connected in grounded wye and secondary windings connected in broken delta can be used in lieu of the three single-phase assemblies 107. In the alternative embodiment using a three-phase transformer instead of the three single-phase assemblies 107, the three-phase transformer needs to be capable of having full phase-to-phase system voltage applied to one or two HV terminals without saturating the core of the three-phase transformer. Thus, if a standard core-coil assembly for a three-phase distribution transformer is used instead of three single core-coil assemblies, the selected three-phase distribution transformer needs to have a rating that exceeds the rating indicated by Eq. (8), in order to avoid saturating the core of the three-phase distribution transformer when full phase-to-phase system voltage is applied to only one or two HV terminals.

Should there be a bolted SLG fault on the backfed primary feeder 14, significant power would be dissipated in the secondary resistor $R_S$ 110 in the broken delta secondary 109 as given by Eq. (4). During backfeed to a solid (bolted) SLG fault on the primary feeder 14 with one or more network protectors 8 failing to open, the magnitude of the voltage across the resistor $R_S$ 110 in the broken delta secondary 109 in FIG. 6 is given by Equation (90)

$$V_{RS} = \sqrt{3}\frac{KV_{\varphi\varphi}}{N} \text{ Volts} \qquad (9)$$

The power $P_{RS}$ that is dissipated in the resistor $R_S$ 110 in the broken delta secondary 109 is given by Equation (10) where the details of the development of the final result are shown.

$$P_{RS} = \frac{V_{RS}^2}{R_S} = \frac{\frac{3KV_{\varphi\varphi}^2}{N^2}}{\frac{3R_{0\Omega}}{N^2}} = \qquad (10)$$

$$\frac{KV_{\varphi\varphi}^2}{R_{0\Omega}} = \frac{KV_{\varphi\varphi}^2}{X_{C0\Omega}} = 1000*KVA_{CTOTAL} \text{ Watts} = KVA_{CTOTAL} \text{ kW}$$

From Eq. (10), the power that is dissipated in the resistor $R_S$ 110 in the broken delta secondary 109 during a bolted SLG fault on the backfed primary feeder 14 is equal to the three-phase charging kVAr of the primary feeder 14. For example, if the charging kVAr, $KVA_C$, were 40 kVAr per mile and the total length of the backfed primary feeder (including all taps) were 5 miles, the total charging kVAr, $KVA_{CTOTAL}$ would be 200 kVAr, and the power dissipated in the resistor $R_S$ 110 would be 200 kW, not an insignificant value. If this level of dissipation persisted for a long time period, the resistor $R_S$ 110 could get damaged, or the temperature of the oil 103 in the tank 102 with the resistor $R_S$ 110 would exceed the allowable value. To prevent damage to the resistor $R_S$ 110, the sensing and control mechanism 105 is configured to monitor the voltage across the secondary resistor $R_S$ 110, as well as the temperature of the oil 103 (which corresponds to the temperature of the resistor $R_S$ 110), as there are threshold values for the voltage across the resistor $R_S$ 110 and the temperature of the oil 103 that correspond to a threshold unacceptable level of power being dissipated in the resistor $R_S$ 110. The sensing and control mechanism 105 is configured to execute an appropriate control algorithm to close the three-phase grounding switch 112 when the power dissipated in the resistor $R_S$ 110 exceeds the threshold, in order to blow the fuses in the backfeeding network protector(s) 8 open to protect the resistor $R_S$ 110.

Closing Control for Three-Phase Grounding Switch

Figure 7A:
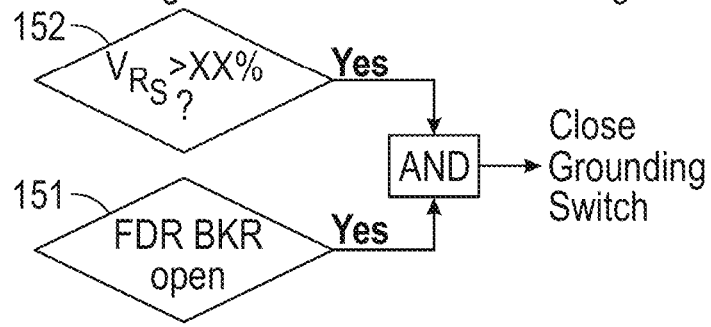
FIG. 7A is a logic diagram of logic that can be incorporated into the control circuits of the transient limiting device shown in FIG. 6 in order to initiate closing of the grounding switch of the transient limiting device, in accordance with an exemplary embodiment of the disclosed concept.

As indicated before, it is imperative that the three-phase grounding switch 112 of the NF SPTL device 100 in FIG. 6 not be closed if the primary feeder breaker 18 at the substation 12 supplying the LV network 1 is closed. Doing so would exceed the fault close rating of the grounding switch 112, and result in removal of the feeder 14 from service. FIG. 7A shows logic that can be incorporated into the control circuitry of the sensing and control mechanism 105 of the NPF SPTL device 100 to initiate closing of the grounding switch 112. As shown in FIG. 7A, the logic incorporated into the control circuits of the sensing and control mechanism 105 ensures that the grounding switch 112 will only be closed if both of two conditions are true: (1) the feeder breaker 18 at the substation 12 is open (decision 151 in FIG. 7A), and (2) the voltage across the resistor $R_S$ 110 in the broken delta secondary 109 exceeds a specified level (decision 152 in FIG. 7A).

Figure 7B:
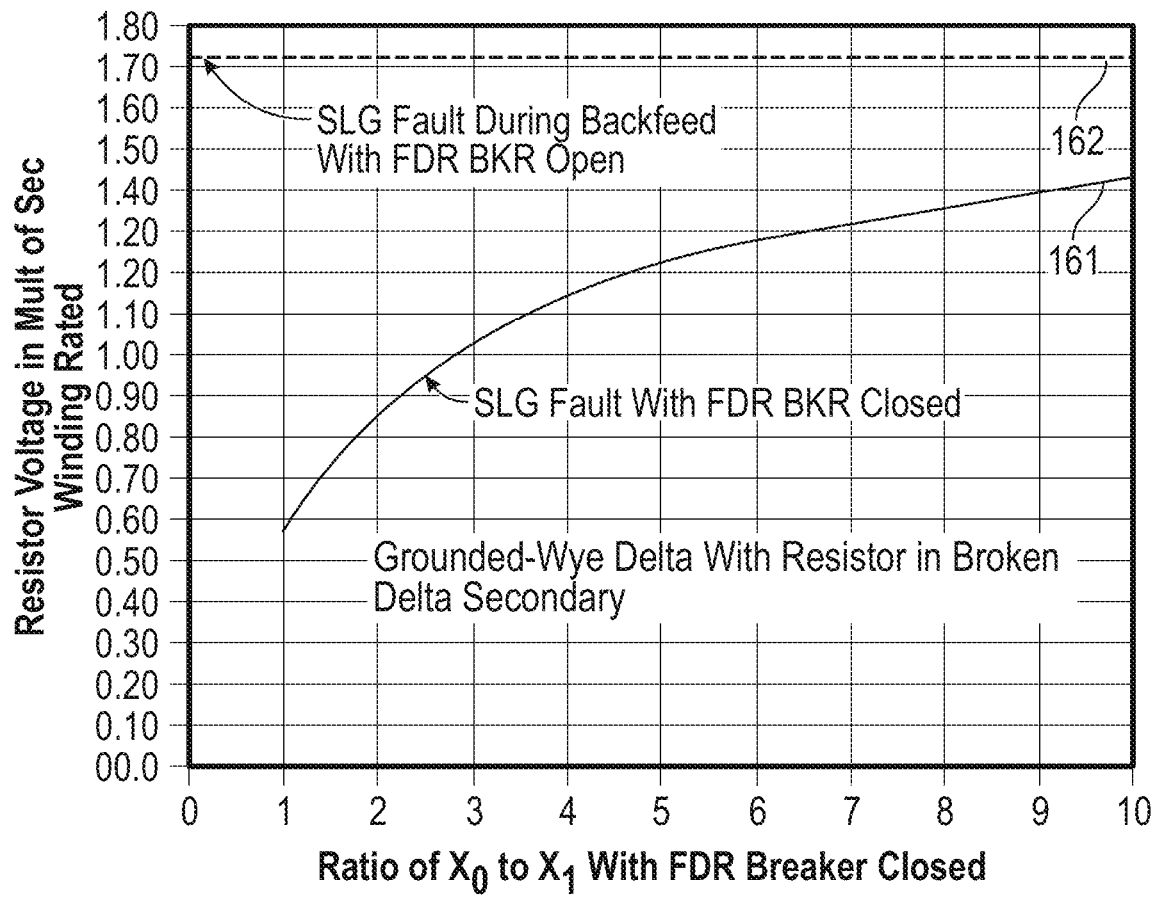
FIG. 7B is a graph showing, for a resistor of the transient limiting device shown in FIG. 6, two voltage curves representing the voltage that appears across the resistor as a function of the ratio of the zero-sequence reactance to the positive sequence reactance for a single line to ground (SLG) fault occurring when the feeder breaker is closed and for a SLG fault occurring when the feeder breaker is open, in accordance with an exemplary embodiment of the disclosed concept.

It should be noted that when either a SLG or DLG fault occurs on the primary feeder 14 with the feeder breaker 18 at the substation 12 closed, a voltage will appear across the resistor $R_S$ 110 in the broken delta secondary 109 in FIG. 6. The voltage that appears across the resistor $R_S$ 110 can be expressed in multiples of the secondary winding 109 rated voltage, and is a function of the ratio of the zero-sequence reactance, $X_0$, at the substation bus 13 to the positive sequence reactance, $X_1$, which is determined by the type of system grounding used at the substation 12. Referring now to FIG. 7B, curve 161 shows, for a bolted SLG fault occurring when the feeder breaker 18 at the substation 12 is closed, the voltage appearing across the resistor $R_S$ 110 (in multiples of the secondary winding 109 rated voltage) versus the $X_0$ to $X_1$ ratio with the feeder breaker 18 closed. This voltage is a function of the ratio of $X_0$ to $X_1$ of the system 1 at the substation bus 13 that feeds the primary feeder 14. In contrast, the curve 162 shows the voltage that appears across the resistor $R_S$ 110 in the broken delta secondary 109 for a bolted SLG fault on the primary feeder 14 occurring when the feeder breaker 18 at the substation 12 is open. From these two curves 161, 162 it can be concluded that, if it were certain that a SLG fault were the only type of fault that could occur on the primary feeder 14, then the control logic for closing the grounding switch 112 could be based solely on the magnitude of the voltage across the resistor $R_S$ 110 in the broken delta secondary 109, as FIG. 7B demonstrates that the magnitude of the voltage across the resistor $R_S$ 110 in the broken delta secondary 108 is significantly greater when the feeder breaker 18 is open than when the feeder breaker 18 is closed.

Figure 7C:
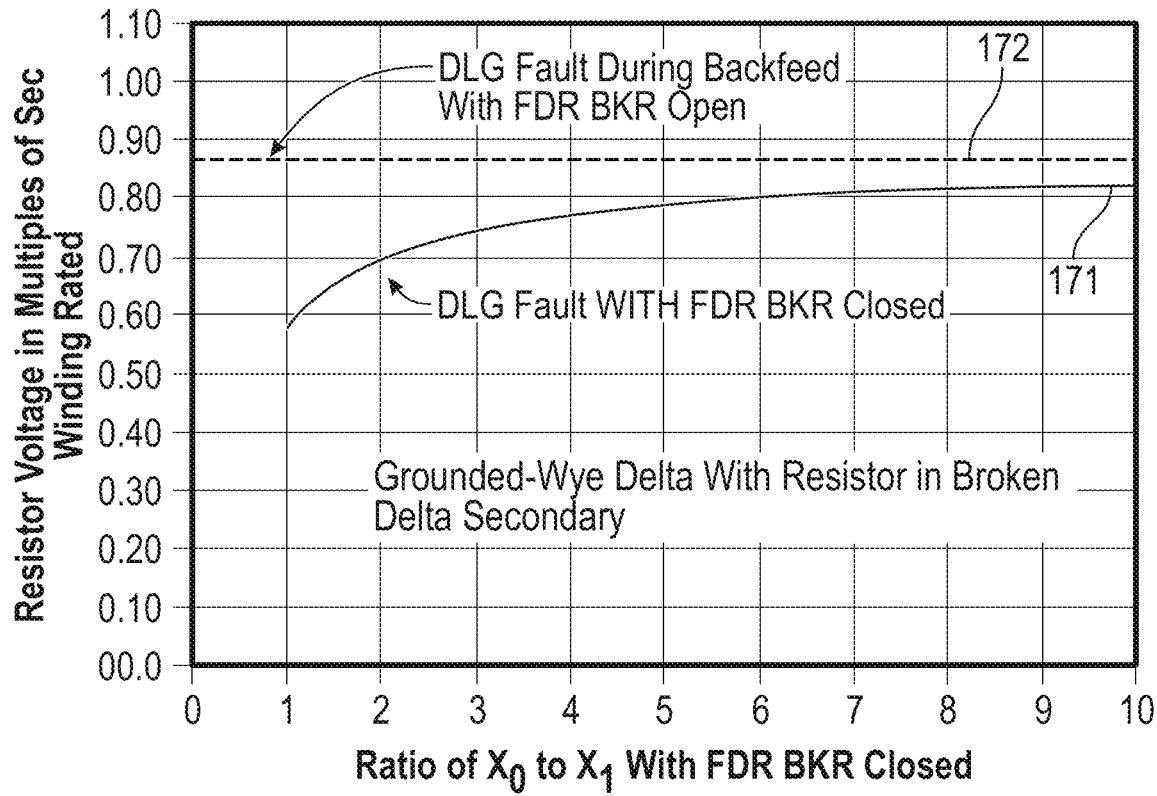
FIG. 7C is a graph showing, for a resistor of the transient limiting device shown in FIG. 6, two voltage curves representing the voltage that appears across the resistor as a function of the ratio of the zero-sequence reactance to the positive sequence reactance for a double line to ground (DLG) fault occurring when the feeder breaker is closed and for a DLG fault occurring when the feeder breaker is open, in accordance with an exemplary embodiment of the disclosed concept.

However, in practice, there is a possibility of a bolted DLG fault also occurring on a primary feeder 14, and FIG. 7C shows that the voltage produced across the resistor $R_S$ 110 in the broken delta secondary 109 of FIG. 6 during a bolted DLG fault differs significantly from the voltage produced during a SLG fault. Referring now to FIG. 7C, curve 171 shows the voltage across the resistor $R_S$ 110 in the broken delta secondary 109 produced during a bolted DLG fault that occurs when the feeder breaker 18 at the substation 12 is closed, and curve 172 shows the voltage across the resistor $R_S$ 110 in the broken delta secondary 109 produced during a DLG fault that occurs when the feeder breaker 18 at the substation 12 is open. From the curve 172 that applies when the feeder breaker 18 is open, it is seen that the secondary network 1 will function as desired during backfeed to a DLG fault if the grounding switch 112 closes when the voltage across the resistor $R_S$ 110 exceeds 86.6% of the secondary winding rated voltage.

In comparing the plot for bolted DLG faults shown in FIG. 7C to the plot for bolted SLG faults shown in FIG. 7B, it is clear that there is a significant difference between the voltage across the resistor $R_S$ 110 when the feeder breaker 18 is open during a SLG fault and the voltage across the resistor $R_S$ 110 when the feeder breaker 18 is open during a DLG fault. Thus, the reason that the decision logic for closing the grounding switch 112 requires the feeder breaker 18 be open is that there is a range of voltages across the resistor $R_S$ 110 that lie between the curve 172 in FIG. 7C and the curve 162 in FIG. 7B, meaning that there is an overlap between the voltage levels that are present when a DLG fault occurs with the feeder breaker 18 open and the voltage levels that are present when a SLG fault occurs with the feeder breaker 18 closed. That is, if the closing logic for the grounding switch 112 was based only on a threshold voltage across the resistor $R_S$ 110, selecting a threshold voltage low enough to be indicative of a DLG fault with the feeder breaker 18 open (i.e. a voltage that only slightly exceeds the values on curve 172 in FIG. 7C) could cause the grounding switch 112 to be closed when a SLG fault is occurring with the feeder breaker 18 closed. For example, if the feeder breaker 18 were closed and the sensing and control mechanism 105 were configured to close the ground switch 112 based on the resistor $R_S$ 110 voltage exceeding only 86.6% of secondary winding rated voltage (i.e. low enough to detect a DLG fault with the feeder breaker 18 open), then the grounding switch 112 would also close for a SLG fault on the primary feeder 14 with the feeder breaker 18 closed, and a SLG fault would occur on the primary feeder 14.

When determining what percentage of the secondary winding 108 rated voltage to use as a threshold for the grounding switch close logic shown in FIG. 7A, the threshold should be chosen to ensure that the grounding switch $R_S$ 110 will close during backfeed to both a DLG fault and a SLG fault. In other words, because the voltage across the resistor $R_S$ 110 with the feeder breaker 18 open during a DLG fault is significantly lower than during a SLG fault with the feeder breaker 18 open, the threshold must be low enough to cause the sensing and control mechanism 105 to close the grounding switch 112 when there is a DLG fault. Accordingly, in an exemplary embodiment of the NF SPTL device 100, the grounding switch circuit of the sensing and control mechanism 105 is configured to allow closing if the resistor $R_S$ 110 voltage is above approximately 70% of secondary winding 108 rated voltage and the feeder breaker 18 at the substation 12 is open. It will be appreciated that the threshold voltage can safely be set to a level lower than the voltage level produced for a DLG fault that occurs when the feeder breaker 18 is open due to the fact that the sensing and control mechanism 105 will only close the grounding switch 112 if the feeder breaker 18 is already open.

With reference to the grounding switch closing control logic shown in FIG. 7A, various communication systems can be implemented between the substation 12 and the location of the NPF SPTL device 100, and the position of the feeder breaker 18 can be obtained using said communication systems. For example and without limitation, if the NPF SPTL device 100 is located in close proximity to the substation 12, a hard-wired circuit from the feeder breaker 18 "a" or "b" contact to the NPF SPTL device 100 can give a reliable indication of the feeder breaker 18 position (open or closed). In another non-limiting example, if the NPF SPTL device 100 is remote from the substation, a fiber optic cable can be used to communicate the position of the primary feeder breaker (i.e. whether the primary feeder breaker is open or closed).

Figure 8:
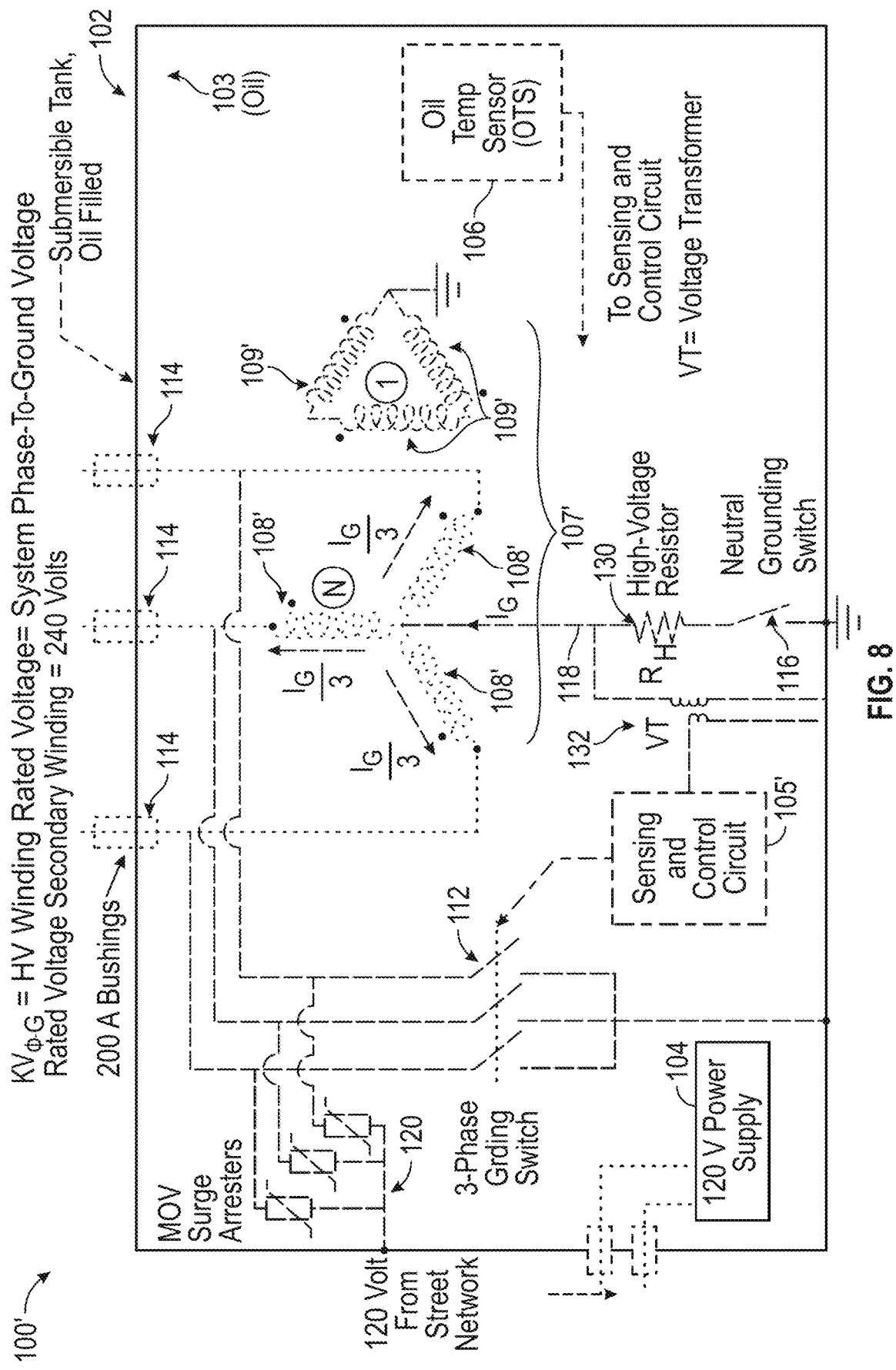
FIG. 8 shows a schematic depiction of an alternative configuration of the transient limiting device shown in FIG. 6, in accordance with an exemplary embodiment of the disclosed concept.

An alternative embodiment of the NPF SPTL device 100 is shown in FIG. 8, and is referred to as the NPF SPTL device 100'. It is noted that the NPF SPTL device 100' shown in FIG. 8 comprises several of the same components as the NPF SPTL device 100 shown in FIG. 6. Accordingly, several of the reference numbers used in FIG. 6 are also used in FIG. 8, to denote that the corresponding components perform similar functions in both embodiments 100 and 100'. However, a prime symbol is added to certain reference numbers used in FIG. 8 that correspond to reference numbers used in FIG. 6, to indicate that the position and/or function of the component differs somewhat in the embodiment 100' shown in FIG. 8, as compared to the embodiment 100 shown in FIG. 6. In the NPF SPTL device 100' shown in FIG. 8, the HV windings 108' of the three single-core-coil assemblies 107' are connected in grounded wye, and the secondary windings 109' are connected in closed delta. Inserted between the neutral of the HV windings 108' and ground is a high-voltage (HV) resistor, $R_H$ 130. The ohmic value of $R_H$ 130 is given by Equation (11), detailed herein below. A voltage transformer VT 132 monitors the voltage across the HV resistor $R_H$ 130, and provides input to the sensing and control mechanism 105'.

In the embodiment 100' shown in FIG. 8, the rated voltage of the HV winding 108' of each single-phase core-coil assembly 107' is the rated phase-to-phase voltage of the primary system, divided by the square root of 3, i.e. the phase-to-ground voltage of the primary system. The ohmic value of the HV resistor 130 is given by Eq. (11):

$$R_{H\Omega} = \frac{R_{0\Omega}}{3} = \frac{X_{C0\Omega}}{3} \text{ Ohms} \tag{11}$$

where $R_{0\Omega}$=the resistance in Ohms to be inserted into the zero-sequence network of the primary feeder 14. As per Eq. 3, this is equal to the zero-sequence capacitive reactance of the backfeed primary feeder 14 in Ohms, $X_{C0\Omega}$.

With the ohms of the HV resistor $R_H$ 130 selected as given by Eq. (11), the current $I_G$ that flows in the connection between the neutral point of the HV windings 108' of the wye connected windings is given by Eq. (12):

$$I_G = 3\frac{1000KV_{\varphi\varphi}/\sqrt{3}}{R_{0\Omega}} \text{ Amps} \tag{12}$$

The current $I_G$ is the same current that flows when a LV resistor 110 is in the broken delta secondary windings 109 as in FIG. 6. One third of this current flows in the HV winding 108 of each single-phase core-coil assembly 107' for the bolted SLG fault on the backfed primary feeder 14.

The kVA rating required for each single-phase core-coil assembly 107' is given by Eq. (13):

$$KVA_T = \frac{I_G}{3}\frac{KV_{\varphi\varphi}}{\sqrt{3}} = \frac{1000KV_{\varphi\varphi}^2}{3R_{0\Omega}} = \frac{1000KV_{\varphi\varphi}^2}{3X_{C0\Omega}} \text{ kVA} \quad (13)$$

In comparing Eq. (13) to Eq. (7), it is seen that when a HV resistor 130 is used as in FIG. 8, the kVA rating of each single-phase core-coil assembly 107' is 58% of that required when the low-voltage resistor $R_S$ 110 is placed in the broken delta secondary windings 109 as in FIG. 6 (the expression for $KVA_T$ in Eq. (13) is equivalent to the expression for $KVA_T$ in Eq. (7) multiplied by $1/\sqrt{3}$).

However, the HV windings 108' in FIG. 8 must be fully insulated on both ends. That is, both ends of the HV windings 108' need a HV bushing 114. As previously stated, in the NPF SPTL device 100 shown in FIG. 6, the neutral end of each HV winding 108 is connected to a point of the sealed tank 102 that is connected to ground via the neutral grounding switch 116, while the other end of each HV winding 108 is connected to the top of the sealed tank 102 and to the primary feeder 14, so each HV winding 108 only needs one HV bushing 114 at the end of the HV winding 108 that is connected to the top of the sealed tank 102 and to the primary feeder 14. However, in the NPF SPTL device 100' shown in FIG. 8, the neutral point of each HV winding 108' is not connected to the sealed tank 102 (since the high-voltage resistor $R_H$ 130 is connected between the neutral point and ground), and thus the potential of the neutral point will rise up to a high value when faults occur on the primary feeder 14. Thus, two HV bushings 114 must be used for each HV winding 108' in the NPF SPTL device 100' shown in FIG. 8, with one bushing 114 being used for the end of the HV winding 108' connected to the top of the sealed tank 102 for connection to the primary feeder 14, and another bushing 114 being used at the neutral end of the HV winding 108'.

When a bolted SLG fault occurs on the backfed primary feeder 14, with the feeder breaker 18 at the substation 12 being open, the voltage across the HV resistor $R_H$ 130 will equal the system phase-to-neutral voltage, or $KV_{\varphi\varphi}$ divided by $\sqrt{3}$. Given that the resistor $R_H$ 130 has a resistance of $X_{C0\Omega}/3$ as shown in Eq. (11), the power $P_{RHV}$ dissipated in the HV resistor $R_H$ 130 during a bolted SLG fault is given by Equation (14):

$$P_{RHV}=[KV_{\varphi\varphi}/\sqrt{3}]^2/[X_{C0\Omega}/3]=1000KVA_{CTOTAL}$$
$$\text{Watts}=KVA_{CTOTAL} \text{ kW} \quad (14)$$

From Eq. (14) and Eq. (10), it is seen that the power dissipated in the HV resistor $R_H$ 130 in Watts in FIG. 8 during a bolted SLG fault is the same as the power dissipated in the LV resistor $R_S$ 110 placed into the broken delta secondary 109 in FIG. 6. Thus, either the configuration 100 of FIG. 6 or the configuration 100' of FIG. 8 can be used to implement a NPF SPTL device in a power distribution system. Cost would likely be a significant factor in determining which configuration to use for a particular power distribution network, and detailed design calculations would need to be performed on a case-by-case basis to evaluate the cost of the two configurations for a given network.

Required Close and Latch Rating for the Three-Phase Grounding Switch

As previously stated and as shown in FIG. 7A, the three-phase grounding switch 112 in the NPF SPTL device 100 of FIG. 6 or 100' of FIG. 8 is controlled to be closed only if the primary feeder breaker 14 at the network (area) substation 12 is open. Power for closing of the grounding switch 112 is obtained from a 120-volt circuit from a nearby manhole with secondary circuits of the 208Y/120-volt grid (area) network. One non-limiting example of a mechanism suitable for use in the grounding switch 112 for closing the grounding switch 112 is a spring close mechanism. The springs in the mechanism are not charged during normal operation in order to minimize the chance of the grounding switch 112 closing with the primary feeder breaker 18 at the network substation 12 being closed. Instead, the springs are charged only when the sensing and control mechanism 105 determines that the grounding switch 112 should be closed. The springs are then discharged to close and latch the three-phase grounding switch 112, which would then blow the fuses in the backfeeding network protector(s) 8 that have failed to open. It will be appreciated that several types of mechanisms other than spring close mechanisms are suitable for use in closing and latching the grounding switch 112 into a three-phase fault, e.g. such as a solenoid or equivalent mechanism, and that these other mechanisms be used instead of a spring close mechanism without departing from the scope of the disclosed concept.

Grounding switches 112 are used on the HV side of each network transformer 7, and once placed in the ground position, must be able to carry the maximum three-phase fault current available from the network substation 12 that supplies the network primary feeders 14. In some distribution systems this current can be 40 kA or higher. However, in the NPF SPTL device 100 or 100', the three-phase grounding switch 112 is closed only when the primary feeder breaker 14 at the network (area) substation 12 is open. The current that the grounding switch 112 must close and latch against is determined by the size of the backfeeding network transformer 7. When there is just one network transformer 7 backfeeding, the upper limit on the three-phase current $I_{B \ UPPER \ LIMIT}$ (in amperes) that the grounding switch 112 must close into is given by Equation (15) below. This equation assumes that the LV network at the backfeed location is an infinite bus, so the calculated value is the greatest upper bound (worst case):

$$I_{B \ UPPERLIMIT} = \frac{KVA_{NWKT}}{\sqrt{3}KV_{\varphi\varphi}}\frac{100}{Z_{T\%}} \text{ Amperes} \quad (15)$$

wherein:

$KVA_{NWKT}$=Size of the backfeeding network transformer in kVA $Z_{T\%}$=Nameplate impedance of the backfeeding network transformer in percent. Industry standards specify the impedance for network transformers of different sizes.

$KV_{\varphi\varphi}$=Rated voltage of the delta connected HV winding of the backfeeding network transformer in kVA.

Table 1 below lists the upper bound on the backfeed currents from a single network transformer 7 in amperes that the grounding switch 112 in the NPF SPTL device 100 of FIG. 6 or device 100' of FIG. 8 must close and latch against, for network transformers of various sizes. In an exemplary embodiment of NPF SPTL device 100 or 100', a close and latch rating of 5,000 amperes (5 kA) is used for the three-phase grounding switch 112, as this rating provides a large margin for any unexpected surges in backfeed current values based on the maximum backfeed current values provided in Table 1.

TABLE 1

Greatest Upper Bound on the Backfeed Current from a Single Network Transformer.

| Backfeeding Transformer | | | Maximum Backfeed |
|---|---|---|---|
| Size (kVA) | Impedance (%) | Rated HV (kV) | Current (Amperes) |
| 500 | 5 | 13.8 | 418 |
| 750 | 5 | 13.8 | 628 |
| 1000 | 5 | 13.8 | 837 |
| 1500 | 7 | 13.8 | 897 |
| 2000 | 7 | 13.8 | 1195 |
| 2500 | 7 | 13.8 | 1491 |

Note:
LV network at backfeeding network transformer is assumed to be an infinite bus.

Although the close and latch rating of the grounding switch 112 is based upon the maximum current with the primary feeder breaker 18 open, a switch 112 capable of closing and latching into the three-phase fault current available from the substation 12 can alternatively be used, but doing so would require a more robust and expensive three-phase ground switch, with a much higher close and latch rating. It is noted that the energy that either resistor $R_S$ 110 of FIG. 6 or $R_H$ 130 of FIG. 3 must absorb during backfeed to a SLG fault or a DLG fault is limited by closing of the three-phase grounding switch 112, which blows the fuses in the backfeeding network protector 8. It is further noted that, although the resistor $R_S$ 110 in the embodiment 100 of FIG. 6 is classified as a low voltage resistor, it has been demonstrated herein that the resistor $R_S$ 110 must have a very high power rating. Specifically, in the embodiment 100' of FIG. 8, in which the HV resistor $R_H$ 130 is used, the power rating of the resistor $R_H$ 130 is the same as that required for the embodiment 100 of FIG. 6, where the resistor $R_S$ 110 is in the broken delta secondary 108.

Network Self Protecting Transient Limiting Device Backfeed to a Bolted Double Line-to-Ground (DLG) Fault on the Primary Feeder The criteria for selecting the ratings for the components and in particular the ohmic value of the resistor in the NPF SPTL device 100 is based on a backfeed to the arcing SLG fault on the primary feeder with the feeder breaker open. But DLG faults also occur on network primary feeders where two primary phases are short circuited to ground (shields or concentric neutrals of primary cables). For the bolted DLG fault on the primary feeder with the primary feeder breaker open, and at least one backfeeding network protector closed, the voltage to ground on the unfaulted primary phase is given by Equation (16):

$$V_{UNFAULTIEIV} = \frac{1.5}{\sqrt{3}} KV_{\varphi\varphi} = \frac{\sqrt{3}}{2} KV_{\varphi\varphi} = 0.866 KV_{\varphi\varphi} \text{ kV} \quad (16)$$

From Eq. (16), the voltage to ground on the unfaulted phase with the bolted DLG fault on the backfed primary feeder 14 with a closed protector 8 is 86.6% of the primary system phase-to-phase voltage, and the voltage on the other two phases is zero. Since the HV winding 108 of the single-phase core-coil in the NPF SPTL device 100 of FIG. 6 is rated for phase-to-phase voltage based upon backfeed to the SLG fault, the single-phase core on the unfaulted primary phase will not experience a voltage higher than the system nominal phase-to-phase voltage during backfeed to the bolted DLG fault.

During the backfeed to the DLG fault with the feeder breaker 18 at the substation 12 open and with one backfeeding protector 8 closed, the voltage $V_{RS}$ across the resistor $R_S$ 110 in the broken delta secondary 109 in FIG. 6 is given by Equation (17):

$$V_{RS,DLG} = \frac{\sqrt{3}}{2} \frac{K_{\Phi\Phi}}{N} = \frac{1}{2} V_{RS,SLG} \text{ Volts} \quad (17)$$

Referring briefly to Eq. (9), it is noted that Eq. (9) gives the voltage across the resistor $R_S$ 110 in the broken delta secondary 109 for the bolted SLG fault on the primary feeder 14, and in comparing Eq. (17) to Eq. (9), it is seen that the voltage across the resistor $R_S$ 110 for the DLG fault as given by Eq. (17) is one half of the voltage across the resistor in the broken delta secondary for the SLG fault.

The development of the power dissipated in the resistor $R_S$ 110 across the broken delta secondary 109 for the design in FIG. 6 for a bolted DLG fault on the primary feeder 14 with the feeder breaker 18 open and one protector 8 backfeeding is shown by Equation (18) below, from which it is seen that during the backfeed to the DLG fault with the feeder breaker 18 open, the power dissipated in the resistor $R_S$ 110 in the broken delta secondary 109 is one fourth of the total charging kVAr of the primary feeder 14, or one fourth of the power dissipated during backfeed to the SLG fault with the primary feeder breaker 18 open (see Eq. (10)).

$$P_{RS} = \frac{V_{RS}^2}{R_S} = \frac{\frac{3}{4} \frac{KV_{\varphi\varphi}^2}{N^2}}{\frac{3R_{0\Omega}}{N^2}} = \quad (18)$$

$$\frac{KV_{\varphi\varphi}^2}{4R_{0\Omega}} = \frac{KV_{\varphi\varphi}^2}{4X_{C0\Omega}} = \frac{1}{4} 1000 KVA_{CTOTAL} \text{ Watts} = KVA_{CTOTAL} \text{ kW}$$

For backfeed to the SLG fault on the primary feeder 14, with a backfeeding protector 8 failing to open, the current in the backfeeding network protector 8 is not high enough to blow the network protector fuses. Without closing of the three-phase grounding switch 112 in the NPF SPTL device 100, the capability of the resistor $R_S$ 110 would be exceeded, and the temperature of the oil 103 could exceed the flash point. However, with the sensing and control mechanism 105 in the NPF SPTL device 100, the condition is sensed and the three-phase ground is applied to blow the three network protector fuses in the backfeeding network protector 8. This will prevent overheating and burning of the insulation on reduced size neutral cables connected to the X0 bushing of the backfeeding network transformer 6, and will prevent damaging annealing of reduced size copper neutral bus attached to the X0 bushing of the backfeeding network transformer 6.

Figure 9B:
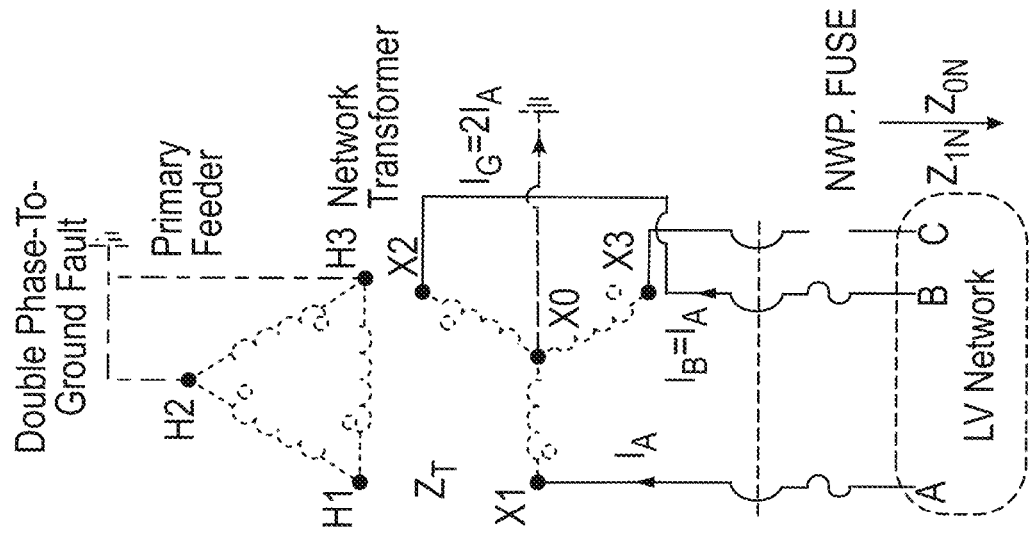
FIG. 9B is a schematic diagram of the same network protector shown in FIG. 9A, showing that a fuse blows in the phase of the backfeeding network protector that sees the same magnitude of current as for backfeed to a three-phase fault on the primary feeder.
Figure 9A:
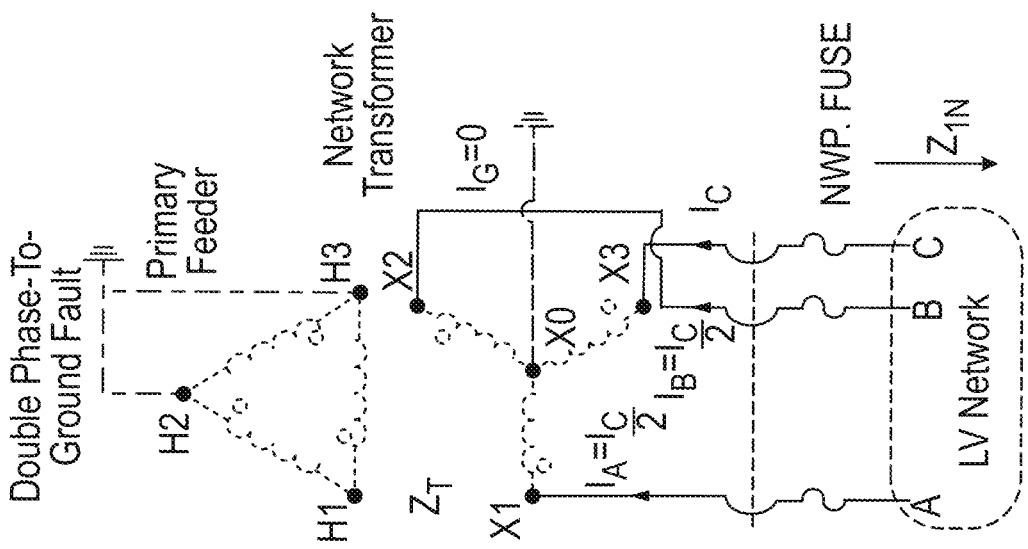
FIG. 9A is a schematic diagram showing the magnitude of current in each phase of a backfeeding network protector during a solid (bolted) double line to ground (DLG) fault when the network protector fails to open and the feeder breaker at the substation is open.

With a bolted DLG fault on the primary feeder 14 with the feeder breaker 18 at the substation 12 open, with a network protector 8 failing to open, in one phase of the backfeeding network protector 8 the current is the same as a backfeed to a three-phase fault on the feeder 14, and the magnitude of the current in each of the other two phases of the backfeeding network protector 8 is approximately one half of that for backfeed to the three-phase fault. This condition is shown in FIG. 9A. If the protector 8 fails to open, the first thing that happens is that the fuse in the phase which sees the same current as for backfeed to a three-phase fault blows, which is the fuse in phase C in FIG. 9A (FIG. 9B shows the fuse in phase C having blown).

After the first fuse blows, the current in the other two phases of the protector 8, whose magnitude is approximately 50% of the magnitude of that for backfeed to a three-phase fault, decreases below 50%. How much the current decreases depends upon the stiffness of the LV network system at the backfeed location, and the ratio of the zero-sequence impedance to the positive-sequence impedance of the LV network at the backfeed location. Depending on the type of fuses installed in the backfeeding network protector 8, a second fuse may not blow or will blow hundreds of seconds after the first fuse blows.

With backfeed to the DLG fault on the primary and one blown fuse in the backfeeding protector 8, on the primary feeder 14 with the DLG fault, the voltage to ground on the unfaulted HV phase is 0.866 times the rated phase-to-phase voltage of the primary system. That is, its magnitude is the same as that before the first fuse blows in the backfeeding network protector 8.

The voltage across the resistor $R_S$ 110 in the broken delta secondary 109 of the NPF SPTL device 100 in FIG. 6 with one blown fuse in the network protector 8 backfeeding the DLG fault is that given by Eq. (17), i.e. 86.6% of the rated voltage of the secondary winding of the single-phase core-coil assembly in the NPF SPTL device 100 in FIG. 6. The sensing and control mechanism 105 monitoring the voltage across the resistor $R_S$ 110 in the broken delta secondary would detect this, and after appropriate time delay close the three-phase grounding switch 112 in the NPF SPTL device 100 in FIG. 6, provided that the primary feeder breaker at the substation is open. The control logic shown in FIG. 7A that only allows closing of the grounding switch 112 if the feeder breaker 18 at the substation 12 is open removes all voltage from the resistor $R_S$ 110 in the broken delta secondary 109. The response of the NPF SPTL device 100 for backfeed to the DLG fault is similar.

It is widely recognized in the utility industry that if a network protector 8 fails to open for backfeed to a bolted DLG fault on the primary feeder 14, the first fuse to blow is the one seeing the same current as for backfeed to the three-phase fault. However, after the first fuse blows, the fuses in the other two phases of the backfeeding network protector 8 may not blow for a long time. Under these conditions, the current in the X0 bushing of the network transformer 7 is twice that in the two fuses of the protector 8 that have not blown, as shown and discussed later herein in relation to FIG. 9B.

FIG. 9A shows the currents in the backfeeding network protector 8 for a DLG fault on the primary feeder 14 with the feeder breaker 18 open and no blown fuses in the backfeeding network protector 8. The voltage from the unfaulted primary phase to ground, which would be connected to the network transformer 7 high-voltage terminal H1, is 86.6 percent of the HV system phase-to-phase voltage as given by Eq. (16). After the fuse in phase C blows, as it sees twice the current in the fuses in phase A and B, as shown in FIG. 9B. Still referring to FIG. 9B, the current in phases A and B are nearly equal, but the current $I_G$ in the X0 bushing of the network transformer 7 is twice the current in the fuses in phases A and B. In existing systems, this is the condition which has resulted in overheating of the neutral cables connected to the X0 bushing of the transformer 7 when reduced size neutrals are used, and further resulted in cable fires and damage in existing systems. When copper bus is used for the neutral connection to the X0 neutral busing of the network transformer 7, and is of reduced size, it has resulted in severe overheating and annealing of the copper neutral bus. For this condition, the NPF SPTL device 100 detects the overvoltage and after appropriate time delay closes the three-phase grounding switch 112. This causes the network protector fuses to blow in secondary phases A and B in FIG. 9B. So, an additional benefit of the NPF SPTL device 100 is that it can prevent overheating of secondary neutrals, and cable fires when the secondary neutral is of reduced size and made from cable.

Figure 10A:
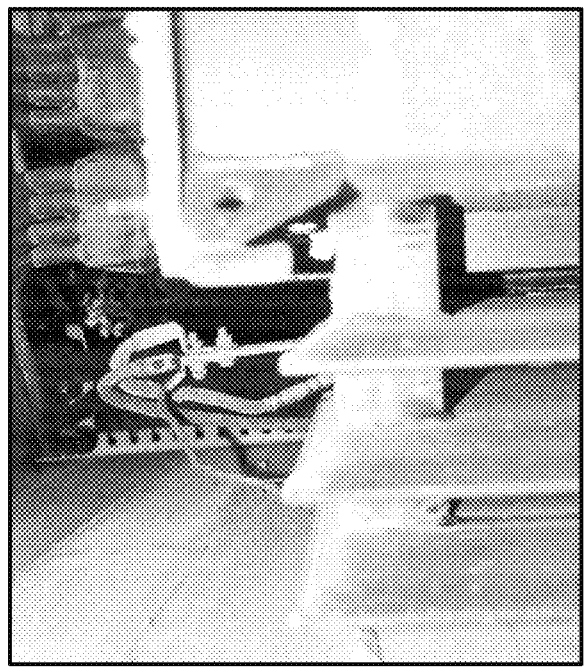
FIG. 10A is a photograph of an actual power distribution installation showing cable insulation that burned as a result of a backfeed to a double line to ground (DLG) fault when a backfeeding network protector failed to open, a result which the embodiments of the transient limiting device shown in FIG. 6 and FIG. 8 are designed to prevent.
Figure 10B:
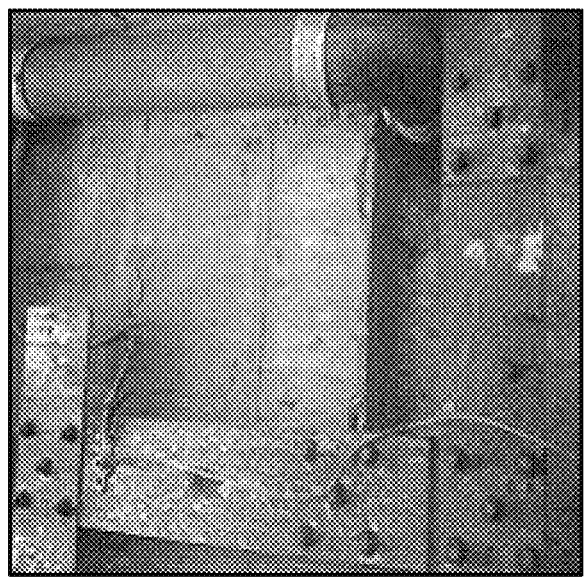
FIG. 10B is a photograph showing damage to a bare copper bus that occurred as a result of a backfeed to a solid double line to ground (DLG) fault on a primary feeder, where only one fuse blew on the network protector as depicted in FIG. 9B, a result which the embodiments of the transient limiting device shown in FIG. 6 and FIG. 8 are designed to prevent.

FIG. 10A and FIG. 10B show photographs of actual installations where there was a backfeed to a DLG fault and a backfeeding network protector failed to open. The photograph in FIG. 10A is of an installation in which insulated cable was used, which resulted in burning of the cable insulation and required evacuation of a high-rise condominium building late in the night. The photograph in FIG. 10B shows damage to bare copper bus occurring during backfeed to a DLG fault on the primary feeder with just one fuse blown in the network protector, as shown in FIG. 9B.

Figure 4:
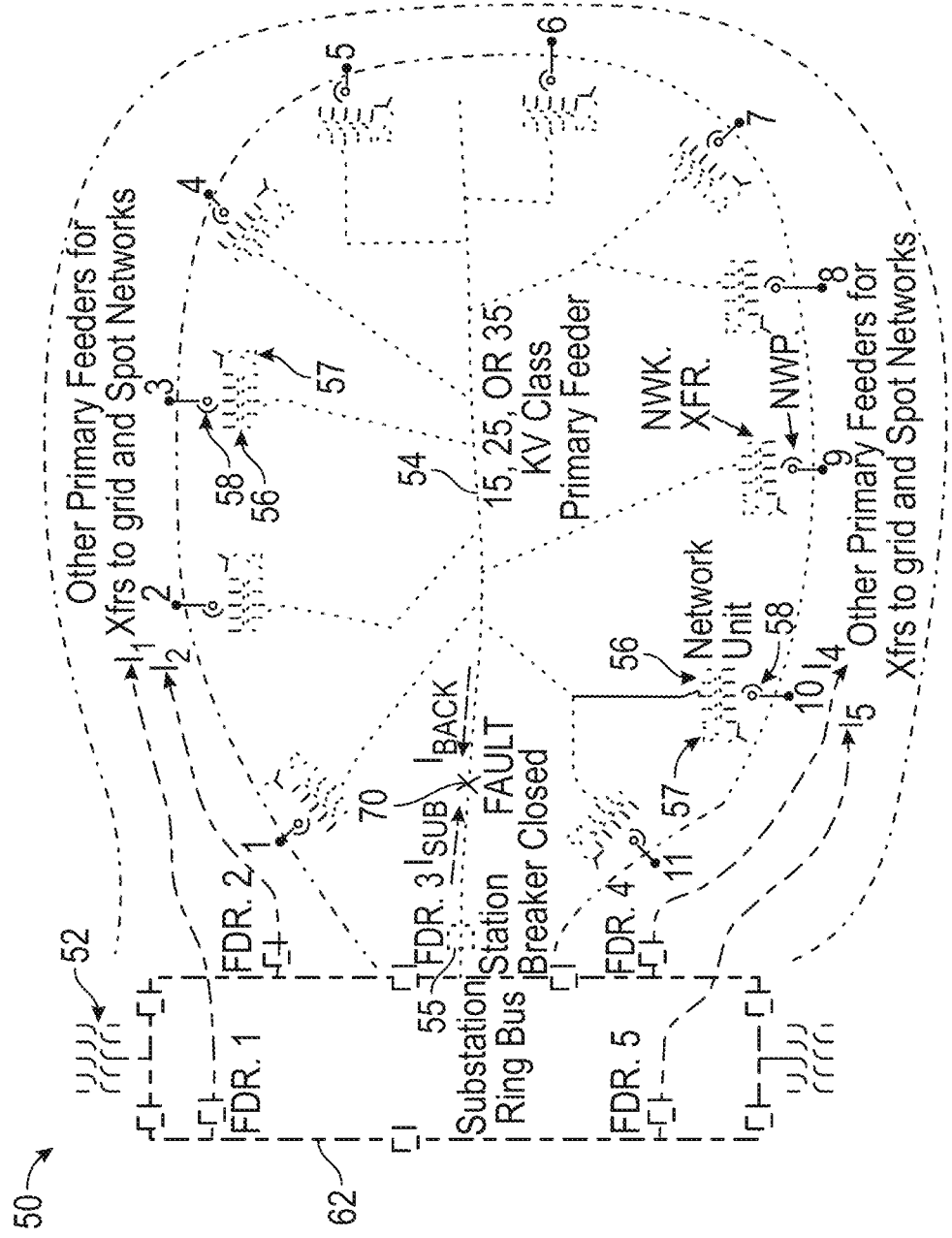
FIG. 4 is a schematic single-line diagram showing a simplified five-feeder low-voltage (LV) power distribution network, with a detail view of one feeder on which there is a short circuit fault, and wherein each load supplied by the one feeder is supplied only by the one feeder.
Figure 5:
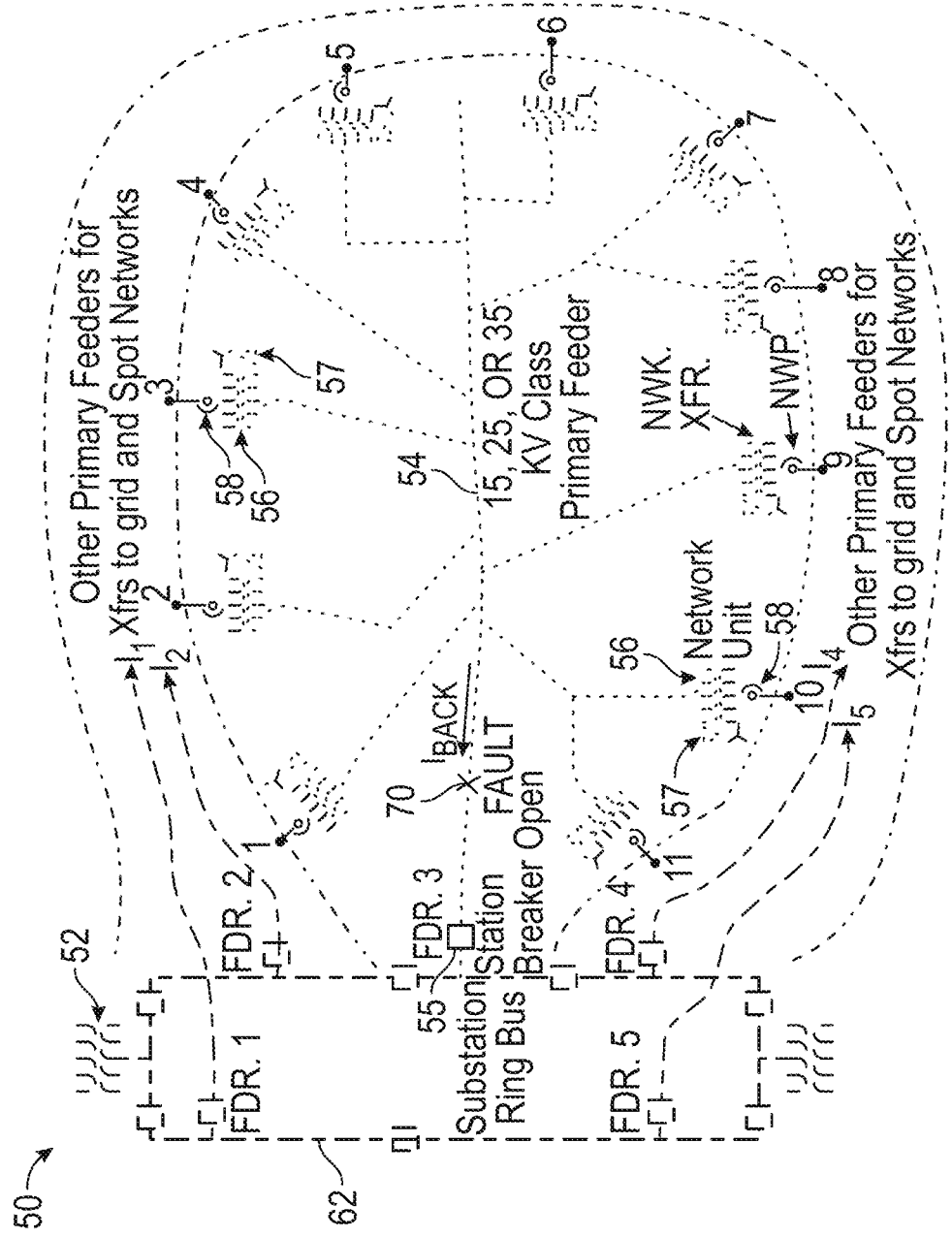
FIG. 5 shows the schematic line diagram shown in FIG. 4 after overcurrent relays for the faulted feeder have detected the short circuit and the feeder breaker has opened.
Figure 11:
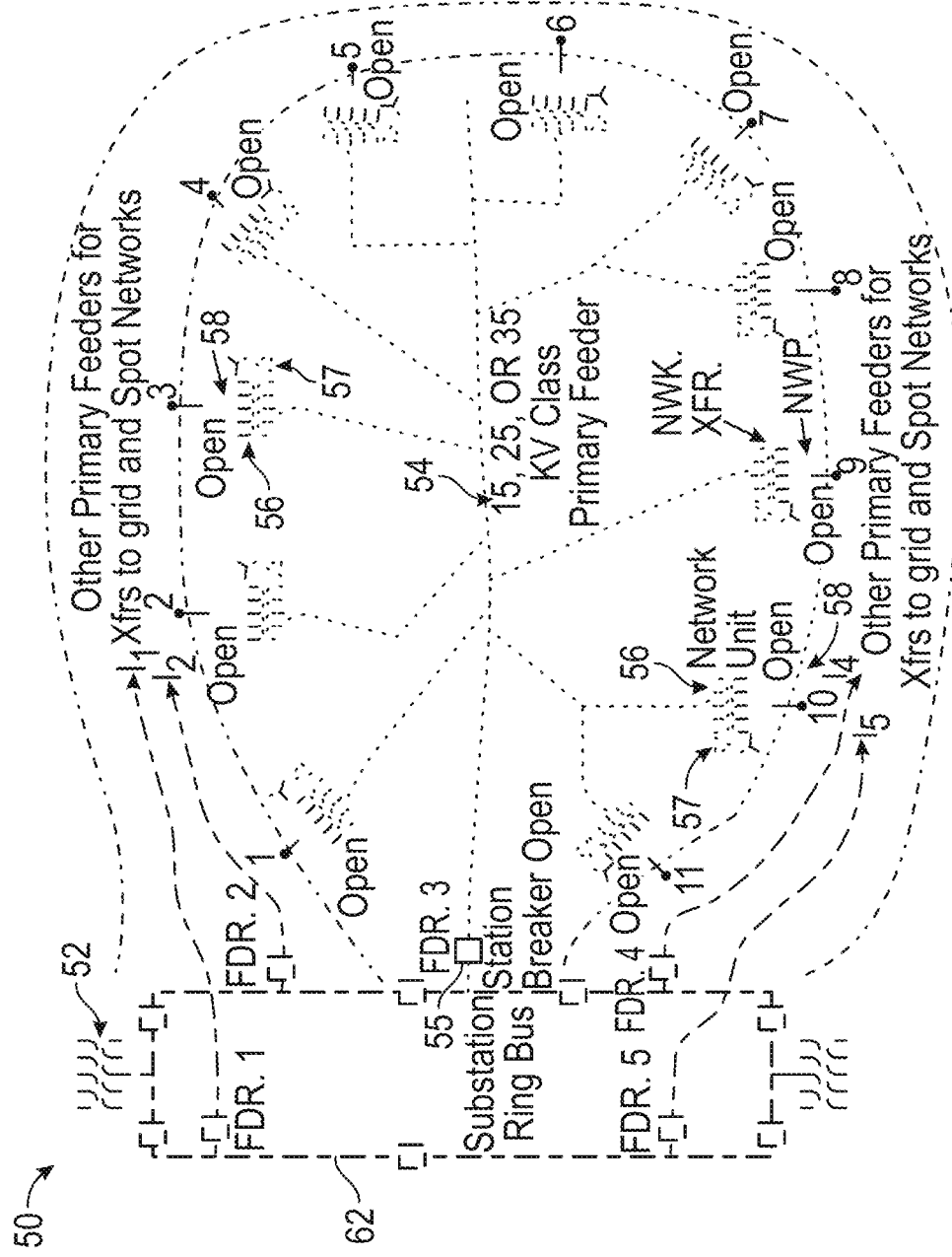
FIG. 11 shows the simplified five-feeder low-voltage (LV) power distribution network shown in FIGS. 4 and 5, with a network primary feeder being out of service and all network protectors on the primary feeder are open.
Figure 12:
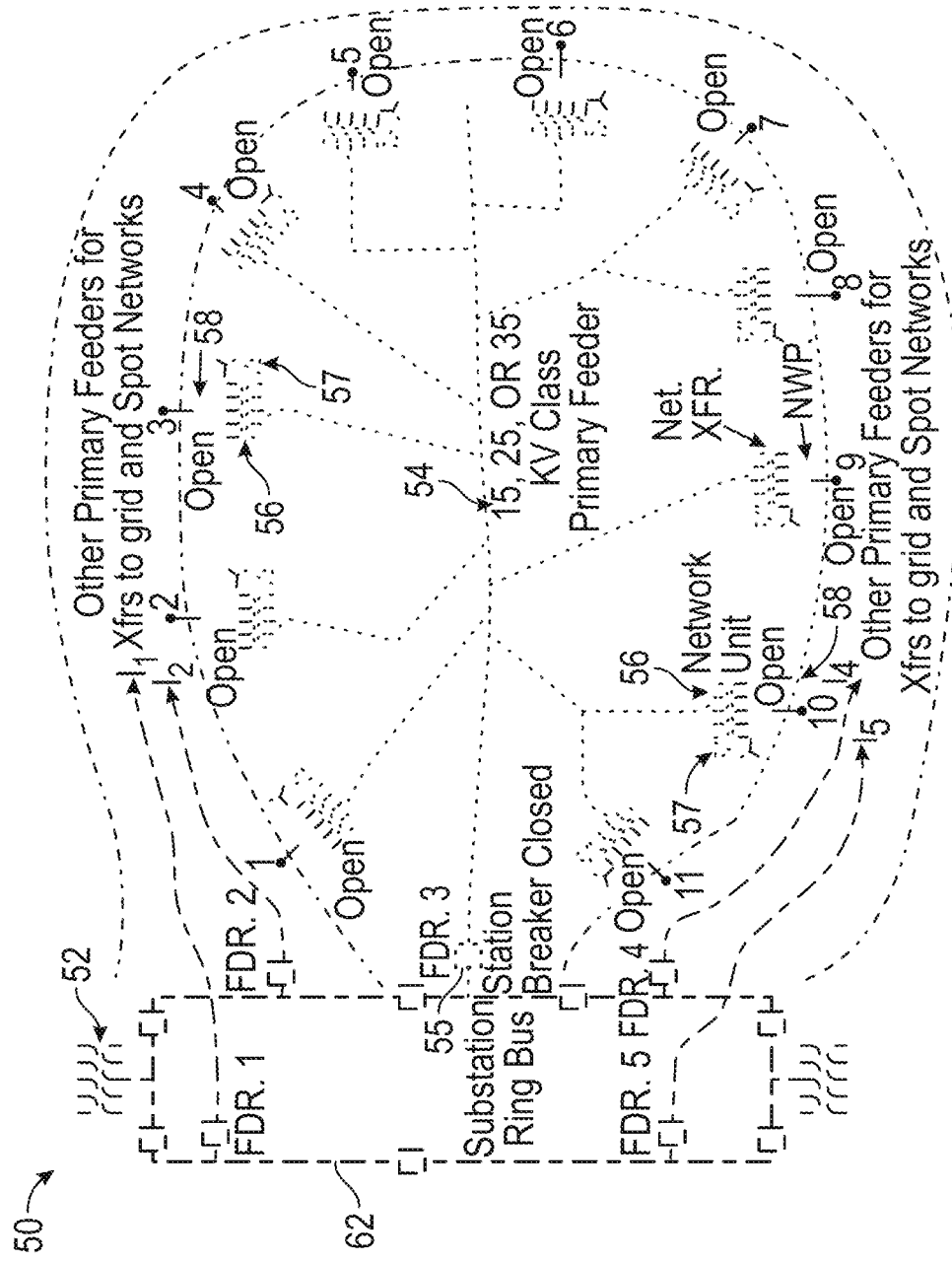
FIG. 12 shows the five-feeder network shown in FIG. 11, with the network primary feeder being returned to service by closing the feeder breaker at the network substation with the network protectors on the feeder open when the feeder breaker is closed, which is a situation in which the embodiments of the transient limiting device shown in FIG. 6 and FIG. 8 can reduce the magnitude of voltage transients that are known to occur.

Other Benefits Realized with the Network Primary Feeder Self Protecting Transient Limiting Device In addition to preventing high overvoltages during backfeed to arcing SLG faults on a network primary feeder whose primary feeder breaker is open, the NPF SPTL device 100, 100' will reduce the transient overvoltages associated with re-energizing a network primary feeder by closing of the station breaker when all network protectors on the feeder are open, as occurs when restoring a network primary feeder that has been out of service. Referring now to FIG. 11, the five-feeder network 50 previously shown in FIGS. 4 and 5 is shown. As shown in FIG. 11, whenever a network primary feeder 54 is out of service for work, maintenance, or to install a new network transformer 56, the network (area) substation feeder breaker 55 is open, and all network protectors 58 on the feeder 54 are open. After all safety grounds are removed from the primary feeder 54 and all tests performed, the feeder 54 is returned to service. This is accomplished by closing the feeder breaker 55 for FDR 3 at the network substation 52 as shown in FIG. 12, where the feeder breaker 55 is closed but all network protectors 58 on the feeder 54 are open at the instant the feeder breaker 55 closes.

When the feeder breaker 55 is closed with all network protectors 58 on the feeder 54 open, transient overvoltages result from the closing of the breaker 55. Some users have experienced insulation failure in components on the network primary feeder 54 when the breaker 55 is reclosed due to transient overvoltages, such as failures in primary cable, cable splices, the HV disconnect and grounding switch on the network transformer 56. All components on the feeder 54 do not experience the same high transient overvoltages, because there are transmission and reflections of the traveling waves at the tap points on the feeder 54 when the feeder breaker 55 at the substation 52 is closed. If the transient overvoltages from the switching cause an insulation failure, the resultant short circuit causes the circuit breaker 55 that was closed at the network substation 52 to immediately trip (open). This then requires that the utility must located the fault caused by the transient overvoltages, repair the fault, and then try to return the feeder 54 to service. This increases the outage time for the feeder 54, which increase the chance of a fault occurring on another primary feeder 54.

The NPF SPTL device embodiments 100 and 100', which place resistance into the zero-sequence network of the primary feeder 54, will reduce the magnitude of the voltage transients that occur when the primary feeder breaker 55 is closed with all network protectors 58 on the feeder 54 being open, thus reducing the chance of an insulation failure and fault when the primary feeder 54 is re-energized by closing of the feeder breaker 55 at the network (area) substation 52. The NPF SPTL device embodiments 100 and 100' include either an operating handle or electrically operated mechanism that allows opening of the three-phase grounding switch 112 so that the primary feeder 54 can be placed back into service following repairs to the faulted portion. The operating handle or electrically operated mechanism contains electrical and mechanical interlocks so that the grounding switch 112 cannot be operated under conditions that would exceed its ratings.

In addition to voltage transients, the other phenomenon that occurs when the feeder breaker 55 is closed at the substation 52 to return the feeder 54 to service is that the network transformers 56 draw very high magnetizing inrush currents. The effects of the inrush currents are then further amplified, because peak forces caused by the magnetizing inrush currents are proportional not to the peak magnitude of the inrush current, but to the square of the peak magnitude. If the peak of the inrush current for a network transformer 56 is 20 times the peak rated current of the network transformer 56, the peak forces are 400 times those under rated conditions for the network transformer 56 and the HV disconnect and grounding switch on the network transformer 56. It should be noted that the embodiments 100 and 100' of the NPF SPTL device disclosed herein will not reduce the magnitude of the magnetizing inrush currents to the network transformer 56.

Additional Configurations of the NPF SPTL Device

Variations on several aspects of the NPF SPTL device 100, 100' can be implemented without departing from the scope of the disclosed concept. For example, in the embodiment 100, while the resistor $R_S$ 110 is depicted in FIG. 6 as being located in the main sealed tank 102, the resistor $R_S$ 110 can alternatively be placed in a different oil-filled tank separate from the tank 102 in which the three single-phase core-coil assemblies 106 are located, without departing from the scope of the disclosed concept. With appropriate LV bushings on the separate oil-filled tank containing the resistor $R_S$ 110, and with appropriate LV bushings on the main tank 102 containing the single-phase core-coil assemblies 106, LV cable connections are made between the main tank 102 and the tank with the low-voltage resistor $R_S$ 110. With the alternate embodiment 100' of FIG. 8 where the HV resistor $R_H$ 130 is used, the resistor $R_H$ 130 also could be placed in a different oil-filled tank separate from the main sealed tank 102. The three-phase grounding switch 112 can also be placed in a different oil-filled tank separate from the main sealed tank 102 containing the core-coil assemblies 106 or 106', without departing from the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A self-contained transient limiting device for use with a low-voltage, LV, network power distribution system, the LV network power distribution system comprising: a plurality of primary feeders; a plurality of feeder breakers corresponding to the plurality of primary feeders such that each feeder breaker connects one of the primary feeders to a substation; a plurality of network transformers, each of the network transformers being connected to one of the primary feeders, each network transformer being connected to its primary feeder between the feeder breaker and a secondary conductor used for powering a load; and a network protector for each network transformer, each given network protector being connected between a secondary side of its corresponding network transformer and the secondary conductor and comprising three fuses, each fuse being connected to one phase of power, the transient limiting device comprising:
   a sealed tank filled with insulating fluid, the insulating fluid having heat transfer properties;
   a power supply;
   a temperature sensor positioned to sense temperature of the insulating fluid;
   a number of core-coil assemblies comprising high voltage windings and low voltage secondary windings, the high voltage windings being connected in a grounded wye configuration and the secondary windings being connected in a broken delta configuration with a broken point;
   a low-voltage resistor connected across the broken point of the broken delta configuration of the secondary windings; and
   a sensing and control mechanism comprising a plurality of circuits and powered by the power supply,
   wherein, for a given one of the primary feeders, the transient limiting device is structured to be connected between the feeder breaker associated with the given primary feeder and the primary side of the network transformers associated with the given primary feeder, and
   wherein the transient limiting device is structured to limit, with resistance provided by the number of core coil assemblies and the low-voltage resistor, transient overvoltages to an arcing single line-to-ground fault on the given primary feeder, provided that the associated feeder breaker is open.

2. The transient limiting device of claim 1, wherein the number of core-coil assemblies comprises either three single-phase core-coil assemblies or a three-phase distribution transformer.

3. The transient limiting device of claim 1, wherein the number of core-coil assemblies comprises three single-phase core-coil assemblies, wherein, if the given primary feeder is backfeeding, a total three-phase charging reactive power $KVA_{C\,TOTAL}$ of the given primary feeder during backfeed is given by the equation:

$$KVA_{C\,TOTAL} = L_F * KVA_C kVAr$$

wherein $L_F$ is the total length, in miles, of the given primary feeder, and wherein $KVA_C$ is the three-phase charging reactive power, in kVAr per mile, of the given primary feeder, and wherein each of the three single-phase core-coil assemblies has a kVA rating, $KVA_T$, given by the equation:

$$KVA_T = \frac{KVA_{CTOTAL}}{\sqrt{3}} \text{ kVA}.$$

4. The transient limiting device of claim 1,
wherein the sealed tank is connected to sheaths or concentric neutrals of cables of the given primary feeder and grounded.

5. The transient limiting device of claim 1,
wherein, during backfeed to arcing single line-to-ground faults on the given primary feeder when the associated feeder breaker is open, for any open network protector that comprises a microprocessor relay and is connected to the given primary feeder, the transient limiting device is structured to limit, with the resistance provided by the number of core coil assemblies and the low-voltage resistor, transient voltages applied to the microprocessor relay.

6. The transient limiting device of claim 1, further comprising:
a neutral grounding switch structured to limit energy input to the low-voltage resistor, the neutral grounding switch being disposed between a neutral point of the grounded wye configuration and ground,
wherein the sensing and control mechanism is configured to ensure that the neutral grounding switch remains open when the associated feeder breaker is closed,
wherein the sensing and control mechanism is configured to determine if the associated feeder breaker is closed or open,
wherein the transient limiting device is self-protecting such that the sensing and control mechanism is configured to close the neutral grounding switch only if the associated feeder breaker is open, and only if voltage across the low-voltage resistor is above a predetermined level.

7. The transient limiting device of claim 6,
wherein a bus of the substation has a zero-sequence reactance, $X_0$,
wherein a positive sequence reactance, $X_1$, of the primary feeder is based on what type of system grounding is used at the substation,
wherein voltage that appears across the low-voltage resistor can be expressed in multiples of the low-voltage secondary windings rated voltage as a function of the ratio of $X_0$ to $X_1$,
wherein the predetermined level is 70% of the low-voltage secondary windings rated voltage expressed as a function of the ratio of $X_0$ to $X_1$.

8. The transient limiting device of claim 6,
wherein the neutral grounding switch is structured to be opened when testing needs to be performed on circuits connected to the given primary feeder and the associated network transformers, and
wherein the testing includes tests required for locating faults on the given primary feeder.

9. The transient limiting device of claim 1,
wherein the transient limiting device is structured to limit, with the resistance provided by the number of core coil assemblies and the low-voltage resistor, transient overvoltages that result when the given primary feeder is energized due to the associated feeder breaker being re-closed after having been open and all network protectors for the given primary feeder being open.

10. The transient limiting device of claim 1,
wherein, if there is a bolted double line-to-ground fault on the given primary feeder, one primary phase of power is unfaulted,
wherein, if a given network protector on the given primary feeder fails to open during backfeed to the bolted double line-to-ground fault, the sensing and control mechanism is configured to determine a voltage of the unfaulted primary phase of power relative to ground for the network transformer connected to the given network protector, and
wherein, if the voltage of the unfaulted primary phase of power exceeds a predetermined voltage level, the sensing and control circuit is configured to allow the grounding switch to close after a predetermined time delay.

11. The transient limiting device of claim 1,
wherein the power supply is structured to be energized by a 120-volt two-wire circuit supplied from a secondary of a three-phase four-wire 208Y/120-volt area network system.

12. The transient limiting device of claim 1, further comprising:
three high voltage, HV, bushings and three single conductor cables corresponding to the three HV bushings,
wherein each HV bushing is coupled to the sealed tank and to one phase of the high voltage windings, and
wherein each single conductor cable is connected between one of the HV bushings and the given primary feeder.

13. The transient limiting device of claim 12, further comprising:
three metal oxide varistor, MOV, surge arresters submerged in the insulating fluid, each MOV surge arrester being connected between a wall of the sealed tank and one of the single conductor cables,
wherein the MOV surge arresters have a maximum continuous operating voltage that equals or exceeds the nominal phase-to-phase voltage of the given network primary feeder.

14. The transient limiting device of claim 1,
wherein the transient limiting device is structured for use with the given primary feeder, provided that the network transformers associated with the given primary feeder have delta connected high voltage windings.

15. A self-contained transient limiting device for use with a low-voltage, LV, network power distribution system, the LV network power distribution system comprising: a plurality of primary feeders; a plurality of feeder breakers corresponding to the plurality of primary feeders such that each feeder breaker connects one of the primary feeders to a substation; a plurality of network transformers, each of the network transformers being connected to one of the primary feeders, each network transformer being connected to its primary feeder between the feeder breaker and a secondary conductor used for powering a load; and a network protector for each network transformer, each given network protector being connected between a secondary side of its corresponding network transformer and the secondary conductor, the transient limiting device comprising:
a sealed tank filled with insulating fluid, the insulating fluid having heat transfer properties;
a power supply;
a temperature sensor positioned to sense temperature of the insulating fluid;

a number of core-coil assemblies comprising high voltage windings and low voltage secondary windings, the high voltage windings being connected in a grounded wye configuration and the secondary windings being connected in a closed delta configuration;

a high-voltage resistor connected between a neutral point of the grounded wye configuration of the high voltage windings and ground; and a sensing and control mechanism comprising a plurality of circuits and powered by the power supply, wherein, for a given one of the primary feeders, the transient limiting device is structured to be connected between the feeder breaker associated with the given primary feeder and the primary side of the network transformers associated with the given primary feeder, and wherein the transient limiting device is structured to limit, with resistance provided by the number of core-coil assemblies and the high-voltage resistor, transient overvoltages to an arcing single line-to-ground fault on the given primary feeder, provided that the associated feeder breaker is open.

16. The transient limiting device of claim 15,
wherein the number of core-coil assemblies can comprise three single-phase core coil assemblies or a three-phase distribution transformer.

17. The transient limiting device of claim 15,
wherein the number of core-coil assemblies comprises three single-phase core coil assemblies,
wherein, if the given primary feeder is backfeeding, a total three-phase charging reactive power $KVA_{CTOTAL}$ of the given primary feeder during backfeed is given by the equation:

$$KVA_{CTOTAL} = L_F * KVA_C \, kVAr$$

wherein $L_F$ is the total length, in miles, of the given primary feeder, and wherein $KVA_C$ is the three-phase charging reactive power, in kVAr per mile, of the given primary feeder, wherein, if the given primary feeder is backfeeding, a zero-sequence capacitive reactance $X_{C0\Omega}$ of the backfed primary feeder during backfeed is given by the equation:

$$X_{C0\Omega} = \frac{KV_{\varphi\varphi}^2}{KVA_{CTOTAL}/1000} \text{ Ohms}$$

wherein $KV_{\varphi\varphi}$ is the phase to phase voltage of the LV power distribution system in kilovolts, and wherein the resistance $R_{H\Omega}$ of the high-voltage resistor is given by the equation:

$$R_{H\Omega} = \frac{X_{C0\Omega}}{3}.$$

18. The transient limiting device of claim 17,
wherein a kVA rating, $KVA_T$, for each of the three single-phase core-coil assemblies is given by the equation:

$$KVA_T = \frac{1000 KV_{\varphi\varphi}^2}{3 X_{C0\Omega}} \text{ kVA}.$$

19. The transient limiting device of claim 15, further comprising:
a neutral grounding switch structured to limit energy input to the high-voltage resistor, the neutral grounding switch being disposed between a neutral point of the grounded wye configuration and ground, and between the high-voltage resistor and ground,
wherein the sensing and control mechanism is configured to ensure that the neutral grounding switch remains open when the associated feeder breaker is closed,
wherein the sensing and control mechanism is configured to determine if the associated feeder breaker is closed or open,
wherein the transient limiting device is self-protecting such that the sensing and control mechanism is configured to close the neutral grounding switch only if the associated feeder breaker is open, and only if voltage across the high-voltage resistor is above a predetermined level.

20. The transient limiting device of claim 15, further comprising:
six high voltage, HV, bushings and three single conductor cables, with a first three of the HV bushings being tank-connected bushings and a second three of the HV bushings being neutral-connected bushings,
wherein each of the tank-connected bushings is coupled to the sealed tank and to one phase of the high voltage windings,
wherein each single conductor cable is connected between one of the three tank-connected bushings and the given primary feeder,
wherein each of the neutral-connected bushings is coupled to a neutral point of one phase of the high voltage windings.

* * * * *